United States Patent
Sakamoto et al.

(10) Patent No.: US 12,512,771 B2
(45) Date of Patent: Dec. 30, 2025

(54) POWER-GENERATING MAGNETOSTRICTIVE ELEMENT AND MAGNETOSTRICTIVE POWER GENERATION DEVICE

(71) Applicant: NIPPON STEEL Chemical & Material Co., Ltd., Tokyo (JP)

(72) Inventors: Hiroaki Sakamoto, Tokyo (JP); Masao Tanabe, Tokyo (JP); Shinichi Terashima, Tokyo (JP)

(73) Assignee: NIPPON STEEL Chemical & Material Co., Ltd., Tokyo (JP)

( * ) Notice: Subject to any disclaimer, the term of this patent is extended or adjusted under 35 U.S.C. 154(b) by 227 days.

(21) Appl. No.: 18/255,881

(22) PCT Filed: Dec. 2, 2021

(86) PCT No.: PCT/JP2021/044214
§ 371 (c)(1),
(2) Date: Jun. 5, 2023

(87) PCT Pub. No.: WO2022/124185
PCT Pub. Date: Jun. 16, 2022

(65) Prior Publication Data
US 2024/0030837 A1    Jan. 25, 2024

(30) Foreign Application Priority Data

Dec. 7, 2020 (JP) .................................. 2020-202619
Jun. 17, 2021 (JP) .................................. 2021-101012

(51) Int. Cl.
*H02N 2/18* (2006.01)
*H10N 35/00* (2023.01)
(Continued)

(52) U.S. Cl.
CPC ........... *H02N 2/186* (2013.01); *H10N 35/101* (2023.02); *H10N 35/85* (2023.02)

(58) Field of Classification Search
CPC ...... H10N 35/85; H10N 35/101; H10N 35/80; H10N 35/01; H02N 2/18; H02N 2/186;
(Continued)

(56) References Cited

U.S. PATENT DOCUMENTS 3,560,172 A * 2/1971 Kench et al. ........ B23K 35/004
428/641
4,104,549 A * 8/1978 Akimoto ................ H10N 35/85
252/62.55
(Continued)

FOREIGN PATENT DOCUMENTS

DE  112015001309 B4 * 5/2021 ............... F03G 7/08
JP      3355811 B2 * 12/2002 ........... H01F 1/4775
(Continued)

OTHER PUBLICATIONS

XP009545424, Fumiya Osanai, et al., "Study on energy harvesting with (100) [001] silicon steel sheet", Summary of the 43th Annual Conference on Magnetics in Japan (2019), Sep. 11, 2019, p. 170.
(Continued)

*Primary Examiner* — Edgardo San Martin
(74) *Attorney, Agent, or Firm* — Shih IP Law Group, PLLC.

(57) ABSTRACT

The task of the present invention is to provide a magnetostrictive power generation device that is low cost and excellent in durability and can achieve a power generation amount equal to or exceeding those of conventional magnetostrictive power generation devices. The present invention provides a power-generating magnetostrictive element that is formed from a laminate comprising at least one electromagnetic steel sheet layer which comprises at least
(Continued)

one electromagnetic steel sheet and satisfies at least one of the following Condition A and Condition B. Condition A: The at least one electromagnetic steel sheet layer comprises two or more electromagnetic sheets, and the two or more electromagnetic sheets are bonded to each other through a brazing material part. Condition B: The laminate further comprises at least one elastic material layer, and the at least one electromagnetic steel sheet layer is bonded to the elastic material layer through a brazing material part.

18 Claims, 6 Drawing Sheets

(51) Int. Cl.
*H10N 35/80* (2023.01)
*H10N 35/85* (2023.01)

(58) Field of Classification Search
CPC ........... H02N 2/188; H01F 1/147; H01F 1/16; H01F 1/14766; H01F 1/14775; H01F 1/14791

See application file for complete search history.

(56) References Cited

U.S. PATENT DOCUMENTS

| | | | | |
|---|---|---|---|---|
| 8,911,565 B2* | 12/2014 | Inaguma | ................... | C23C 2/12 148/320 |
| 10,944,340 B2* | 3/2021 | Ueno | ................... | H10N 35/01 |
| 11,317,545 B1* | 4/2022 | Perera | ................... | H01F 27/22 |
| 12,069,954 B2* | 8/2024 | Miyauchi | ................ | H02N 2/186 |
| 12,225,827 B2* | 2/2025 | Miyauchi | ................ | H02N 2/186 |
| 2014/0346902 A1 | 11/2014 | Ueno | | |
| 2015/0115748 A1 | 4/2015 | Shimanouchi | | |
| 2015/0155472 A1 | 6/2015 | Furukawa | | |
| 2017/0093306 A1* | 3/2017 | Ueno | ................... | H02N 2/188 |
| 2019/0131892 A1 | 5/2019 | Ueno | | |
| 2020/0076332 A1* | 3/2020 | Nakamura | ............ | H02N 2/188 |
| 2021/0172812 A1 | 6/2021 | Narita | | |
| 2022/0407435 A1* | 12/2022 | Miyauchi | ................ | H01F 27/28 |
| 2023/0046395 A1 | 2/2023 | Sakamoto | | |
| 2024/0048076 A1* | 2/2024 | Miyauchi | ................ | H10N 35/80 |

FOREIGN PATENT DOCUMENTS

| | | | |
|---|---|---|---|
| JP | 2015-070741 | A | 4/2015 |
| JP | 2018-148791 | A | 9/2018 |
| JP | 2020-036455 | A | 3/2020 |
| JP | 2021-103940 | A | 7/2021 |
| JP | 2021129479 | A * | 9/2021 |
| JP | 2021136734 | A * | 9/2021 |
| WO | 2013038682 | A1 | 3/2013 |
| WO | 2013186876 | A1 | 12/2013 |
| WO | 2014021197 | A1 | 2/2014 |
| WO | 2018230154 | A1 | 12/2018 |
| WO | 2021132482 | A2 | 7/2021 |

OTHER PUBLICATIONS

Extended European Search Report dated Oct. 11, 2024.
International Search Report from International Application No. PCT/JP2021/044214 mailed Feb. 1, 2022.

* cited by examiner

POWER-GENERATING MAGNETOSTRICTIVE ELEMENT AND MAGNETOSTRICTIVE POWER GENERATION DEVICE

CROSS REFERENCE TO RELATED APPLICATIONS

This is the U.S. national stage of application No. PCT/JP2021/044214 filed Dec. 2, 2021. Priorities under 35 U.S.C. § 119(a) and 35 U.S.C. § 365 (b) are claimed from Japanese Application No. 2020-202619 filed Dec. 7, 2020 and Japanese Application No. 2021-101012 filed Jun. 17, 2021, the disclosure of which are also incorporated herein by reference.

TECHNICAL FIELD

The present invention relates to a power generating magnetostrictive element and a magnetostrictive power generation device.

BACKGROUND ART

In the use of the Internet in a product (Internet of Things, hereinafter abbreviated as "IoT"), which has been developing in recent years, a wireless sensor module, in which a sensor, a power supply, a wireless communication device, and the like are integrated, is used for connecting the product and the Internet. As a power supply of such a wireless sensor module, there is a demand for the development of a power generation device that is capable of generating power from the energy generated in the environment of the installation site without a need of periodic manual maintenance, such as battery replacement or charging.

An example of such a power generation device is a magnetostrictive vibration power generation device using reverse magnetostriction, the reverse effect of magnetostriction. The reverse magnetostriction is a phenomenon in which the magnetization of the magnetostrictive material changes when strain is applied to the magnetostrictive material by vibration or the like. In the magnetostrictive vibration power generation, strain is applied to the magnetostrictive material by vibration, and an electromotive force is generated in the coil wound around the magnetostrictive element, in accordance with the law of electromagnetic induction.

Conventionally, a method for increasing the amount of magnetostriction of a magnetostrictive material has been attempted for enhancing the power generation performance of the magnetostrictive material. This is because when tensile strain and compressive strain are alternately applied to the magnetostrictive material, the larger the amount of magnetostriction, the larger the increase in magnetic flux density change ($\Delta B$) utilizing the reverse magnetostriction, thereby also increasing the power generation output. From this viewpoint, a FeGa alloy, a FeCo alloy, a FeAl alloy, and the like have been developed as materials having large amount of magnetostriction, and power generation devices using these magnetostrictive materials have also been developed (Patent Literatures (PTLs) 1 to 6).

For example, in the power generation device described in PTL 1, in order to reduce variations in quality by improving the power generation performance, a magnetostrictive material and a soft magnetic material are bonded together so as to change the magnetization of the soft magnetic material by the magnetization of the magnetostrictive material. In this way, in addition to the voltage due to the change in the magnetization of the magnetostrictive material, the voltage due to the change in the magnetization of the soft magnetic material is also induced in the detection coil. FeCo, FeAl, Ni, NiFe, NiCo, and the like are described as the magnetostrictive material used, and Fe, FeNi, FeSi, and electromagnetic stainless steels are described as the soft magnetic material. As methods for bonding the magnetostrictive material and the soft magnetic material, thermal diffusion bonding, hot rolling, hot drawing, adhesion, welding, clad rolling, explosive bonding and the like are described.

With respect to the power generation device described in PTL 2, for improving electromotive force, reducing manufacturing cost, and improving mass productivity, a parallel pillar structure combining the magnetostrictive material and the magnetic material is produced, and an actuator having a configuration which uses the magnetic material in a magnetically saturated state obtained by a bias magnetic field is disclosed. In this actuator, the back yoke is U-shaped, and the neutral surface is provided outside the magnetostrictive material, so as to improve the electromotive force by superimposing the change in the bias magnetic field due to vibration to the change in magnetization of the magnetostrictive material. FeGa, FeCo, FeAl, FeSiB, amorphous materials and the like are described as the magnetostrictive materials, and SPCC, carbon steels (SS400, SC, SK, SK2), ferritic stainless steel (SUS430) and the like are described as the magnetic materials. PTL 2 discloses that when producing a parallel pillar structure, both ends of the magnetostrictive material and the magnetic material are fixed by soldering, welding, brazing, resistance welding, laser welding, ultrasonic bonding, adhesives or the like.

PTL 3 discloses a power generation element in which, for improving power generation efficiency and uniform stress loading, a magnetostrictive material and a non-magnetic material (as a reinforcing material) are bonded together so that the cross-sectional area ratio of the magnetostrictive material and the reinforcing material (reinforcement material/magnetostrictive material) becomes >0.8. FeGa, FeCo, FeNi and the like are described as the magnetostrictive material. Filler-containing resins, Al, Mg, Zn, Cu, and the like are described as the reinforcing material. Further, as a method for bonding the magnetostrictive material and the non-magnetic material, ultrasonic bonding, solid phase diffusion bonding, liquid phase diffusion bonding, bonding with resin-based adhesives, bonding with metal brazing materials and the like are described.

In the power generation device of PTL 4, a structure capable of increasing the number of turns of a coil is adopted for improving power generation output. Specifically, a structure is produced in which a magnetostrictive sheet and a non-magnetic structure are surface-bonded together, and magnetic field is refluxed from the magnetostrictive sheet through a U-shaped yoke with a coil wound therearound. FeGa and FeCo are described as the magnetostrictive sheet, and stainless steels (SUS304, etc.) are described as the non-magnetic structure. Further, as a method for the surface bonding of the magnetostrictive plate and the non-magnetic structure, bonding by an adhesive, adhesive sheet (photo-curable resin, heat-curable resin) or the like are described.

In the power generation device of PTL 5, for improving power generation efficiency and applying uniform stress, structures are produced by laminating a magnetostrictive material and a non-magnetic material (reinforcing material), and the produced structures are used as two parallel pillars. FeGa, FeCo, a FeCo amorphous material, a Fe-based amorphous material, a Ni-based amorphous material, a metamagnetic shape memory alloy, a ferromagnetic shape memory alloy, and the like are described as the magnetostrictive materials, and silicon oxide, alumina, polyimide, polycarbonate, fiber reinforced plastic, non-magnetic metals (Al, Cu), and the like are described as the non-magnetic materials; however, there is no description on a method for bonding the magnetostrictive material and the non-magnetic material.

In the power generation device of PTL 6, for improving power generation output, use is made of a structure in which a magnetostrictive material and a magnetic material are placed apart as parallel pillars. By adopting such a structure, the device is designed to use the magnetic material in a magnetically non-saturated state, and to change the magnetic flux of the magnetic material by the change in the magnetic flux of the magnetostrictive material, to thereby output a voltage which is a sum of the voltage induced by the magnetostrictive material and the voltage induced by the magnetic material. FeGa, FeCo, FeNi, FeDyTe are described as the magnetostrictive materials, and ferritic stainless steel, FeSi, NiFe, CoFe, SmCo, NdFeB, CoCr, CoPt are described as the magnetic materials. In addition, regarding the power generation device disclosed in PTL 6, there is a description on the bonding of the magnetostrictive material to a soft magnetic material or non-magnetic material, and a resin adhesive is used for the bonding.

CITATION LIST

Patent Literature

PTL 1
WO2018/230154
PTL 2
Japanese Patent Application Laid-Open No. 2018-148791
PTL 3
WO2014/021197
PTL 4
WO2013/038682
PTL 5
WO2013/186876
PTL 6
Japanese Patent Application Laid-Open No. 2015-70741

SUMMARY OF INVENTION

Technical Problem

As is apparent from the descriptions of PTLs 1 to 6, in the magnetostrictive power generating elements and the magnetostrictive power generating devices, various magnetostrictive materials are used together with other materials. A FeGa alloy, a material known to have a largest amount of magnetostriction, is described as the magnetostrictive material in PTLs 2 to 6, and the FeGa alloy is very expensive because it is manufactured by a single-crystal pulling method (CZ method). A FeCo alloy described in PTLs 1 to 6 are produced by a rolling method, and it is also expensive because it contains Co. Further, the FeAl alloy described in PTLs 1 and 2 is less expensive as compared with the FeGa alloy and FeCo alloy, but is still expensive. The FeAl alloy has additional problems, such as low toughness and difficulty to produce a sheet by a conventional rolling method.

The FeGa alloy, FeCo alloy, and FeAl alloy, the conventionally used magnetostrictive materials, are described in a number of PTLs as magnetostrictive materials used in the power generating magnetostrictive element because these materials have $\lambda 100$ (amount of magnetostriction in <100> direction) of 80 ppm or more. However, these magnetostrictive materials have problems, such as high manufacturing cost and limited moldability.

In view of the above-described problems, when the above-described expensive magnetostrictive materials are used for producing a magnetostrictive power generation device, conventional products employ a structure obtained by producing a power generating magnetostrictive element composed of the magnetostrictive material and another material bonded thereto and, then, fixing the thus produced power generating magnetostrictive element to a frame or the like produced with a less expensive material. PTLs 1 and 6 describe a FeSi alloy (an electromagnetic steel sheet) as a soft magnetic material, but in both PTLs, the FeSi alloy is used as a material to be bonded to the magnetostrictive material, and not as the magnetostrictive material. Such use of the FeSi alloy is a common utility of the FeSi alloy in a conventional magnetic circuitry.

As a bonding method for using a magnetostrictive material bonded to another material, ultrasonic bonding, solid phase diffusion bonding, liquid phase diffusion bonding, resin-based adhesives, bonding with bonding sheets and the like are disclosed in the art, and the main bonding method being used is the bonding with a resin-based adhesive or a bonding sheet. In such a method, preservation of the bonding strength is difficult, and reduction of durability has been a problem.

In addition, PTL 2 and PTL 3 each discloses a brazing material bonding as a bonding method, but has no working example on the use of the brazing material.

Solution to Problem

In view of the above-mentioned problems, the first aspect of the present invention is the following power generating magnetostrictive element.

[1] A power generating magnetostrictive element formed of a laminate comprising at least one electromagnetic steel sheet layer, wherein the electromagnetic steel sheet layer comprises at least one electromagnetic steel sheet; and wherein the laminate satisfies at least one of the following conditions A and B: Condition A: the at least one electromagnetic steel sheet layer comprises two or more electromagnetic steel sheets, and the two or more electromagnetic steel sheets are bonded to each other through a brazing material part, and Condition B: the laminate further comprises at least one elastic material layer, and the at least one electromagnetic steel sheet layer is bonded to the elastic material layer through a brazing material part.

[2] The power generating magnetostrictive element according to [1], wherein the laminate satisfies only the Condition A.

[3] The power generating magnetostrictive element according to [2], wherein the laminate further comprises at least one elastic material layer, and the elastic material layer is bonded to the electromagnetic steel sheet layer.

[4] The power generating magnetostrictive element according to [1], wherein the laminate satisfies both the Condition A and the Condition B.

[5] The power generating magnetostrictive element according to [1], wherein the at least one electromagnetic steel sheet layer consists of one electromagnetic steel sheet, and the laminate satisfies only the Condition B.

- [6] The power generating magnetostrictive element according to any one of [1] to [5], wherein the at least one electromagnetic steel sheet comprised in the electromagnetic steel sheet layer is a grain-oriented electrical steel sheet.
- [7] The power generating magnetostrictive element according to any one of [1] to [5], wherein the at least one electromagnetic steel sheet comprised in the electromagnetic steel sheet layer is a non-oriented electrical steel sheet.
- [8] The power generating magnetostrictive element according to any one of [1] to [7], wherein the elastic material layer is formed of a non-magnetic material.
- [9] The power generating magnetostrictive element according to any one of [1] to [8], wherein the brazing material part comprises Ni as a major element, together with at least one element selected from a group consisting of Cr, Si, Fe, B, P, C, Cu, and Mo, and further comprises at least one oxide selected from a group consisting of a Mg oxide, a Cr oxide, and a Si oxide.
- [10] The power generating magnetostrictive element according to [9], wherein an alloyed region where Fe derived from the electromagnetic steel sheet and Ni derived from the brazing material part are alloyed is present in at least one contact surface between the electromagnetic steel sheet and the brazing material part in the power generating magnetostrictive element, and width of the alloyed region is 2 μm or more as measured by an elemental analysis of a cross-section in a thicknesswise direction of the power generating magnetostrictive element.
- [11] The power generating magnetostrictive element according to any one of [1] to [8], wherein the brazing material part comprises Fe as a major element, together with at least one element selected from a group consisting of Cr, Ni, Si, B, P, C, Cu, and Mo, and further comprises at least one oxide selected from a group consisting of a Mg oxide, a Cr oxide, and a Si oxide.
- [12] The power generating magnetostrictive element according to any one of [9] to [11], wherein the at least one oxide is present in a bulk form in the brazing material part.

The second aspect of the present invention is the following magnetostrictive power generation device.

- [13] A magnetostrictive power generation device, comprising: the power generating magnetostrictive element according to any one of [1] to [12]; and a frame connected to the power generating magnetostrictive element.
- [14] The magnetostrictive power generation device according to [13], wherein the power generating magnetostrictive element and the frame are continuous, and at least a part of the frame comprises the laminate which forms the power generating magnetostrictive element.
- [15] The magnetostrictive power generation device according to [14], wherein an entirety of the frame is integrated with the electromagnetic steel sheet extending from the laminate which forms the power generating magnetostrictive element.
- [16] The magnetostrictive power generation device according to [14], wherein the laminate comprises an elastic material, and wherein an entirety of the frame is integrated with the elastic material extending from the laminate which forms the power generating magnetostrictive element.
- [17] The magnetostrictive power generation device according to [14], wherein an entirety of the frame is integrated with the power generating magnetostrictive element.

Advantageous Effects of Invention

According to the present invention, provided are a magnetostrictive element for power generation and a magnetostrictive power generation device which are lower in cost than those using a FeGa alloy, FeCo alloy or FeAl alloy as a magnetostrictive material, and are capable of achieving not only a magnetostrictive power generation in an amount equivalent to or larger than those of conventional art, but also high durability.

DESCRIPTION OF EMBODIMENTS

Figure 1:
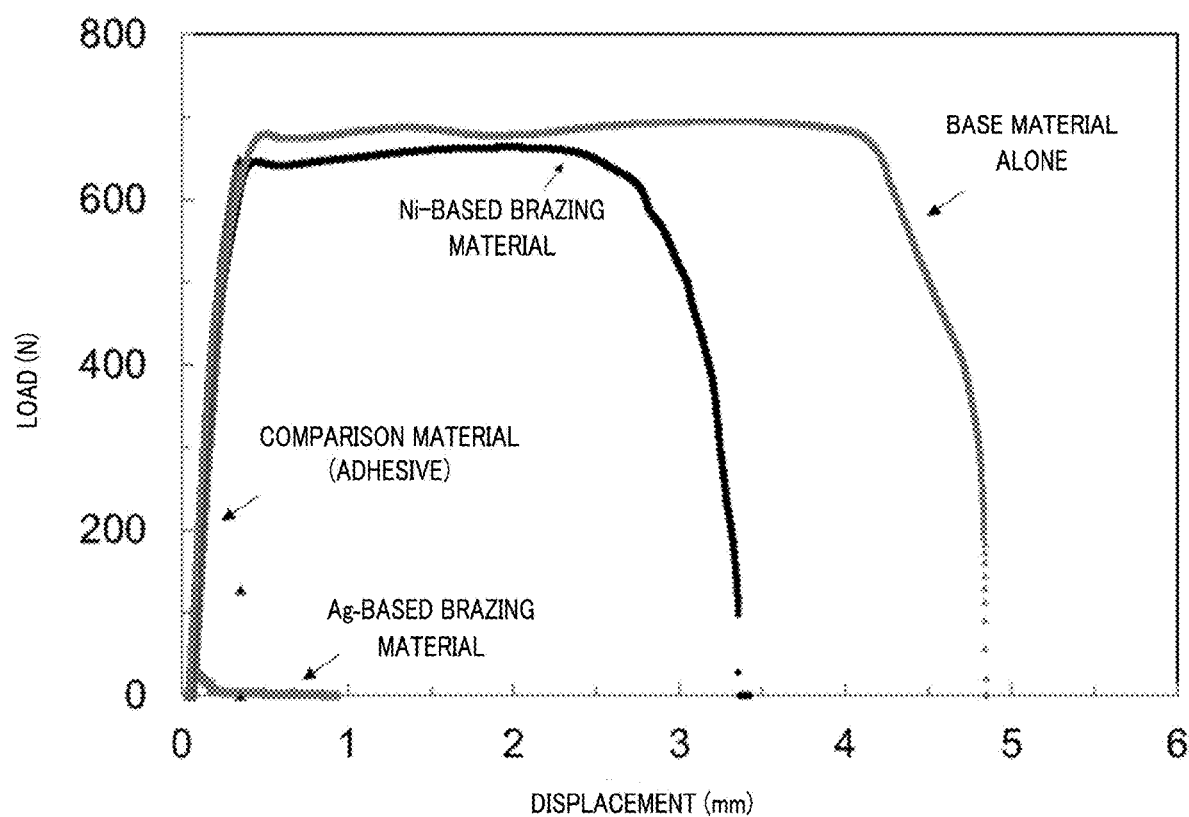
FIG. 1 illustrates a displacement-load curve of a laminate comprising an electromagnetic steel sheet and an elastic material.

As described above, for producing a magnetostrictive power generation device, conventional products employ a structure obtained by producing a power generating magnetostrictive element composed of the magnetostrictive material and another material bonded thereto and, then, fixing the thus produced power generating magnetostrictive element to a frame or the like produced with a less expensive material. As the method for bonding the magnetostrictive material and another material, resin-based adhesives have been mainly used. However, resins are materials with small Young's modulus, and the Young's modulus of an epoxy adhesive having a relatively large Young's modulus is only 2000 MPa (2 GPa), which is several tenth of the Young's moduluses of metals. The present inventors found that in the case where an adhesive is used for bonding an electromagnetic steel sheet in a laminate containing the electromagnetic steel sheet as a magnetostrictive material, when a bending strain caused by vibration is applied to the laminate, the strain is mitigated by a resin layer composed of the adhesive between layers. Such mitigation is due to the small Young's modulus of the resin layer, and leads to the reduction in the amount of the strain applied to the entire laminate. Further, the reduction of the strain leads to the reduction of the power generation of the power generating magnetostrictive element.

In addition, during the operation of a magnetostrictive power generation device comprising the power generating magnetostrictive element containing the above-described laminate, i.e., during vibration of the magnetostrictive element, the low strength of the bonding part composed of the adhesive may cause a problem such that delamination leads to a decrease in durability of the magnetostrictive power generation device.

Use of brazing materials in methods for metal-to-metal bonding have been known, but brazing materials have not been used in the past for laminating electromagnetic steel sheets. The reason for this is that commercially available electromagnetic steel sheets are provided with an insulating coatings or stress coating formed of an oxide material for reducing iron loss, and there is a danger of damaging such a coating during the bonding using a brazing material. Therefore, when laminating plurality of electromagnetic steel sheets for use as a transformer core or a motor core material, the electromagnetic steel sheets have been bonded by mechanical crimping, adhesion by resin, or the like.

Under such a circumstance, the present inventors found that when an electromagnetic steel sheet is used as a magnetostrictive material and either a plurality of the electromagnetic steel sheets or the electromagnetic steel sheet and another material (for example elastic material) are bonded together to form a laminate, bonding through a brazing material part can solve the problem of the durability and the reduction of the power generation due to the reduction in strain. Metal brazing materials are materials with Young's modulus higher than that of the adhesives. Therefore, when the power generating magnetostrictive element contains a laminate in which the electromagnetic steel sheet is bonded via a brazing material, the brazing material is capable of suppressing the reduction of a strain between the layers when a bending strain is applied to the power generating magnetostrictive element by vibration. Such suppression enables the suppression of the decrease in power generation by the power generating magnetostrictive element.

Further, the brazing material has a higher bonding strength than the resin-based adhesive and is less affected by environmental factors, such as ultraviolet ray and humidity. The use of the brazing material can improve the durability of the magnetostrictive power generation device.

Hereinafter, the present invention will be described with reference to exemplary embodiments, but the present invention is not limited to the following embodiments.

1. Power Generating Magnetostrictive Element

The present invention relates to a power generating magnetostrictive element formed of a laminate comprising at least one electromagnetic steel sheet layer, in which the electromagnetic steel sheet layer comprises at least one electromagnetic steel sheet, and the laminate satisfies at least one of the following conditions A and B:

Condition A: at least one electromagnetic steel sheet layer comprises two or more electromagnetic steel sheets, and the two or more electromagnetic steel sheets are bonded to each other through a brazing material part, and Condition B: the laminate further comprises at least one elastic material layer, and at least one electromagnetic steel sheet layer is bonded to the elastic material layer through a brazing material part.

In the present invention "power generating magnetostrictive element" (which may be abbreviated hereinafter as "magnetostrictive element") means an element that comprises a magnetostrictive part formed of a magnetic material with magnetostrictive properties, i.e., shape change (warpage) due to application of magnetic field, and is capable of generating electricity based on reverse magnetostriction of the magnetostrictive part.

The laminate that forms the power generating magnetostrictive element of the present invention comprises at least one electromagnetic steel sheet layer, and the electromagnetic steel sheet layer comprises at least one electromagnetic steel sheet as the magnetostrictive material. In the present invention, an "electrical steel sheet" is a functional material sometimes referred to as a "silicon steel sheet" in which the magnetic properties of iron are improved by adding silicon (Si) to iron (Fe). The electrical steel sheet used in the present invention is an electrical steel sheet having a silicon content of 0.5% or more and 4% or less. Electromagnetic steel sheet having a silicon content of 0.5% or more and 4% or less is suitable for use in the magnetostrictive part because the added silicon increases the electrical resistance and suppresses the generation of eddy currents which hinder the magnetization change by the alternating vibration.

The electromagnetic steel sheet in the present invention may be or may not be provided with an oxide-based coating. As described below, an electromagnetic steel sheet with an oxide-based coating is preferred in view of a strong metallic bond formed between the electromagnetic steel sheet and the brazing material. The oxide-based coating may be an insulating coating or stress coating provided for the purpose of reducing iron loss on the commercially available electromagnetic steel sheets.

Further, at least one electromagnetic steel sheet contained in the electromagnetic steel sheet layer may be a grain-oriented electrical steel sheet or a non-oriented electrical steel sheet. The electromagnetic steel sheet layer may be composed of one or both of the grain-oriented electrical steel sheet and the non-oriented electrical steel sheet. The grain-oriented electrical steel sheet is a sheet in which the crystallographic orientation of the metal crystals is aligned with the rolling direction of the steel sheet. Specifically, it is an electromagnetic steel sheet having a {110}<001> GOSS texture in which the rolling direction is aligned in <001> direction and the rolled surface is in {110} orientation. On the other hand, the non-oriented electrical steel sheet is an electrical steel sheet with a relatively random crystallographic orientation in which the crystallographic orientation of the metal crystals is not aligned in a particular direction. Both the grain-oriented electrical steel sheet and the non-oriented electrical steel sheet are materials with saturation magnetostriction lower than those of the FeGa alloys and FeCo alloys, but are capable of generating electricity in an amount comparable to or larger than the conventional magnetostrictive materials. The reasons for this are not clear, but are presumed to be as follows.

As described above, the grain-oriented electrical steel sheet has a {110}<001> GOSS texture in which the rolling direction is aligned in <001> direction and the rolled surface is in {110} orientation. When a compression strain is applied to the grain-oriented electrical steel sheet while applying a bias magnetic field in the <001> direction of the grain-oriented electrical steel sheet, the magnetic flux density of the grain-oriented electrical steel sheet changes drastically. Such phenomenon is understood as follows. When a predetermined magnetic field is applied in the <001> direction of the grain-oriented electrical steel sheet, the proportion of the 180° domain parallel to the <001> direction and the 90° domain changes to a proportion where both domains interact synergistically. As a result, when strain is applied to the grain-oriented electrical steel sheet, conversion from the 180° domain to the 90° domain, or conversion from the 90° domain to the 180° domain is likely to occur. Specifically, when compressive strain is applied in a direction parallel to the direction of magnetization of the 180° domain (i.e., in the <001> direction), the 180° domain decreases and the 90° domain increases; and when tensile strain is applied in the <001> direction, the 90° domain decreases and the 180° domain increases. Further, when compressive strain is applied in perpendicular to the direction of magnetization of the 180° domain (i.e., {110} direction), the 90° domain decreases and 180° domain increases; and when tensile strain is applied in the {110} direction, the 180° domain decreases and the 90° domain increases. Such changes in the magnetic domains alter the magnetization of the grain-oriented electrical steel sheet, and the grain-oriented electrical steel sheet functions as the magnetostrictive part of the magnetostrictive element. In a magnetostrictive power generation device, a voltage is induced in the detection coil wound around the magnetostrictive element due to the above-mentioned change of the magnetization.

In addition, a crystal alignment, such as that of the grain-oriented electrical steel sheet, is not present in the non-oriented electrical steel sheet, but the magnetic flux density changes greatly when a strain is applied while applying the bias magnetic field. The non-oriented electrical steel sheet has relatively random crystallographic orientation and, thus, the magnetic domains are smaller than those of the grain-oriented electrical steel sheet. In this situation, when strain is applied to a non-oriented electrical steel sheet, movement of the magnetic domains becomes possible starting from more movable magnetic domains among plurality of magnetic domains, and therefore, a large magnetic flux density change is obtained when the non-oriented electrical steel sheet is used as the magnetostrictive element.

In the present invention, the grain-oriented electrical steel sheet more easily induces a larger change of the magnetization than the non-oriented electrical steel sheet, and therefore the grain-oriented electrical steel sheet is more preferred as the electromagnetic steel sheet contained in the magnetostrictive element.

Specific examples of the grain-oriented electrical steel sheet include ORENTOCORE, ORENTOCORE HI-B (for example, 27ZH100), ORENTOCORE HI-B laser, and ORENTOCORE HI-B PM available from NIPPON STEEL CORPORATION.

Specific examples of the non-oriented electrical steel sheet include HILITECORE (for example, 35H210), and HOMECORE available from NIPPON STEEL CORPORATION.

There is no limitation to the number of electromagnetic steel sheets contained in the electromagnetic steel sheet layer, and may be one or, two or more. Preferably, the number of electromagnetic steel sheets is 1 to 100, more preferably 2 to 20. Since the power generation voltage is proportional to the cross-sectional area of the magnetostrictive element, the power generation voltage can be increased by increasing the cross-sectional area by stacking a plurality of electromagnetic steel sheets. In addition, vibration of the electromagnetic steel sheet causes alternating current magnetization corresponding to the vibration frequency, but when alternating current magnetization is caused in the electromagnetic steel sheet, which is a magnetic substance, there is a generation of an eddy current preventing the magnetization. An electromagnetic steel sheet with smaller sheet thickness, as compared to that with large sheet thickness, is less likely to generate the eddy current, and, therefore, the use of the electromagnetic steel sheet with a small sheet thickness is advantageous in terms of power generation.

The dimension of the power generating magnetostrictive element may vary depending on the dimension of the magnetostrictive power generation device and, therefore there is no particular limitation on the dimension of the electromagnetic steel sheet layer forming the magnetostrictive part in the power generating magnetostrictive element of the present invention. Regarding the dimension of the magnetostrictive part, the larger is preferred because larger voltage can be obtained by increasing the number of turns of the coil in the power generation device. Although there is no particular limitation on the thickness of the electromagnetic steel sheet layer forming the magnetostrictive part, it is generally 0.2 mm or more and 10 mm or less. When the thickness of the magnetostrictive part is 0.2 mm or more, the change in magnetic flux can be increased and this is advantageous for increasing the generated voltage; and when the thickness of the magnetostrictive part is 10 mm or less, this is advantageous for facilitating the design of the rigidity suitable for vibration.

In the case where the electromagnetic steel sheet layer contains two or more electromagnetic steel sheets, the electromagnetic steel sheets are bonded together through a brazing material part. The brazing material part is a bonding part composed of a brazing material, and details of the brazing material part will be described below in connection with the layer configuration of the laminate.

The laminate that forms the power generating magnetostrictive element of the present invention may further comprise at least one elastic material layer. The elastic material layer functions as a stress control part in the magnetostrictive element of the present invention. The "stress control part" in the magnetostrictive element of the present invention is a part for controlling the stress to achieve a state where either one of the compressive strain and the tensile strain is applied to the entire magnetostrictive part when bending strain or the like is applied to the magnetostrictive element. There is no particular limitation with respect to the material forming the stress control part as long as the material is an elastic material capable of achieving the above-mentioned object. Both a non-magnetic material and a magnetic material can be used.

When the elastic material that functions as the stress control part is a non-magnetic material, the magnetic field preferentially flows only through the magnetostrictive part of the magnetostrictive element. This is preferred in view of ease in adjusting the bias magnetic field of the magnetostrictive part. Further, application of a bending strain to a magnetostrictive element having a magnetostrictive part formed of the grain-oriented electrical steel sheet and a stress control part formed of a non-magnetic material causes a larger change of the magnetic flux density as compared to other combination of materials. Reason behind this finding is considered as follows. When a magnetic material is used as the elastic material, occurrence of magnetic interaction between the elastic material and the electromagnetic steel sheet may hinder the conversion of the 90° domain and the 180° domain; however, when the elastic material is a non-magnetic material, such magnetic interaction does not occur, and the conversion of the 90° domain and the 180° domain of the electromagnetic steel sheet are more likely to occur.

Examples of an elastic material which is a non-magnetic material include fiber reinforced plastics (e.g., glass fiber reinforced plastics (GFRP), carbon fiber reinforced plastics (CFRP)), austenitic stainless steels (e.g., SUS304, SUS316, etc.), copper alloys (e.g., brass and phosphor bronze), aluminum alloys (e.g., duralumin), and titanium alloys (e.g., Ti-6Al-4 V), while they are not limitative. Among them, the fiber reinforced plastics and austenitic stainless steels are preferred because these materials have relatively high Young's modulus and are easy to position the neutral surface outside of the magnetostrictive part when bending strain is applied thereto.

Using a magnetic material as the elastic material is effective for cost reduction. When the magnetostrictive part of the magnetostrictive element is either a grain-oriented electrical steel sheet or a non-oriented electrical steel sheet and the elastic material which functions as the stress control part is a steel sheet which is a magnetic material, application of a bias magnetic field results in the flow of the bias magnetic field into both the magnetostrictive part and the stress control part. Since the grain-oriented electrical steel sheet or non-oriented electrical steel sheet forming the magnetostrictive part is originally a material with high magnetic permeability, larger amount of the bias magnetic field flows through the magnetostrictive part, and occurrence of magnetic domain change is considered sufficient for power generation. On the other hand, compared to an element having a stress control part formed of a non-magnetic material, the amount of magnetic force applied to the magnetostrictive part decreases by the amount of magnetic flux flowing through the stress control part formed of a magnetic material. To compensate for this decrease in magnetic force, the strength of a magnet provided in the magnetostrictive power generation device can be increased.

Examples of the elastic material that is a magnetic material include general structural rolled steels (e.g., S S400), general structural carbon steels (e.g., S45C), high tensile strength steels (e.g., HT80), ferritic stainless steels (e.g., SUS430), and martensitic stainless steels (e.g., SUS410), while they are not limitative.

There is no particular limitation to the number of elastic materials contained in the elastic material layer, and may be one, or two or more. In the case where a plurality of elastic materials is included, the elastic material layer may contain either a plurality of the same elastic materials or several different types of elastic materials, and the elastic materials are bonded to each other. The method for bonding the elastic material in the elastic material layer is not limited, but in general, examples of the method include bonding via an adhesive or adhesive sheet, bonding by brazing material, and bonding by liquid phase diffusion.

There is no particular limitation with respect to the dimension of the elastic material layer that functions as a stress control part, but for applying either one of the compressive stress load or tensile stress load to the entirety of the electromagnetic steel sheet layer that forms the magnetostrictive part, the dimension of the elastic material layer is preferably either the same as or larger than that of the electromagnetic steel sheet layer. There is no particular limitation on the thickness of the elastic material layer that functions as a stress control part, but it is generally 0.02 mm or more and 50 mm or less, preferably 0.1 mm or more and 10 mm or less, more preferably 0.2 mm or more and 5 mm or less. The thickness of the elastic material layer being 0.02 mm or more is advantageous for applying either the compressive stress or tensile stress to the entirety of the magnetostrictive part, and the thickness of 50 mm or less enables suppression of the prevention of vibration of the magnetostrictive element.

As described above, the laminate that forms the power generating magnetostrictive element of the present invention contains an electromagnetic steel sheet layer including at least one electromagnetic steel sheet, and optionally, further contains at least one elastic material layer. The number of the electromagnetic steel sheet layers and the elastic material layers is not limited, and examples of the laminate include a laminate composed only of an electromagnetic steel sheet layer, a laminate containing one electromagnetic steel sheet layer and one elastic material layer, a laminate containing a plurality of electromagnetic steel sheet layers and one elastic material layer, and a laminate containing a plurality of electromagnetic steel sheet layers and a plurality of elastic material layers. While various layer configurations are conceivable for the laminate that forms the power generating magnetostrictive element of the present invention, at least one of the following conditions A and B should be satisfied.

Condition A: at least one electromagnetic steel sheet layer comprises two or more electromagnetic steel sheets, and the two or more electromagnetic steel sheets are bonded to each other through a brazing material part, and Condition B: the laminate further comprises at least one elastic material layer, and at least one electromagnetic steel sheet layer is bonded to the elastic material layer through the brazing material part.

The brazing material part provided between the electromagnetic steel sheet and the electromagnetic steel sheet and/or between the electromagnetic steel sheet layer and the elastic material layer is a bonding part composed of a metal brazing material capable of bonding to an electromagnetic steel sheet.

In the case where the electromagnetic steel sheet layer of the laminate that forms the power generating magnetostrictive element of the present invention contains two or more electromagnetic steel sheets, the laminate satisfies Condition A. Specifically, the plurality of electromagnetic steel sheets contained in the electromagnetic steel sheet layer is bonded to each other through the brazing material part. In the case where the plurality of electromagnetic steel sheets is bonded to each other through the brazing material part, when a bending strain is applied to the laminate through vibration during the operation of the magnetostrictive power generation device, the brazing material part (the bonding part composed of the brazing material inbetween the electromagnetic steel sheets) can suppress the reduction of the strain applied to the entire laminate. Further, the suppression of the reduction of the strain can suppress the reduction of the power generation of the power generating magnetostrictive element.

Further, the brazing material constituting the brazing material part has a bonding strength higher than that of the resin-based adhesive and is less affected by environmental factors, such as ultraviolet rays and humidity, and therefore, use of the brazing material enables an improvement in the durability of the magnetostrictive element.

In the case where the laminate forming the power generating magnetostrictive element of the present invention satisfies the above-mentioned Condition A and comprises the elastic material layer, there is no particular limitation with respect to the method for bonding the elastic material layer to the electromagnetic steel sheet layer. The elastic material layer may be bonded by a common bonding method, such as bonding through an adhesive or an adhesive sheet, bonding by liquid phase diffusion, and bonding through a brazing material part. When the electromagnetic steel sheet layer of the laminate according to the present invention does not satisfy Condition A, for example, when the electromagnetic steel sheet layer consists of only one electromagnetic steel sheet, then the laminate always satisfies Condition B. That is, the electromagnetic steel sheet layer and the elastic material layer are bonded through the brazing material part. The electromagnetic steel sheet being bonded through the brazing material part suppresses the reduction of the power generation by suppressing the reduction of the strain applied to the entire laminate, and also improves the durability of the magnetostrictive power generation device.

In addition, the laminate that forms the power generating magnetostrictive element of the present invention may satisfy both Condition A and Condition B. From a view point of the strength of the laminate and the durability of the device, it is preferable that all layers contained in the laminate be bonded through the brazing material part.

Examples of laminate structures of the laminate that satisfies at least one of conditions A and B include the following structures (1) to (8), while they are not limitative. In the following structures, the part described as "adhesive part" for convenience can be changed to a bonding part formed by a bonding means other than a brazing material or an adhesive.

(1) Electromagnetic steel sheet/brazing material part/electromagnetic steel sheet
(2) Electromagnetic steel sheet/brazing material part/elastic material
(3) Electromagnetic steel sheet/brazing material part/electromagnetic steel sheet/adhesive part/elastic material
(4) Electromagnetic steel sheet/brazing material part/electromagnetic steel sheet/brazing material part/elastic material
(5) Electromagnetic steel sheet/brazing material part/electromagnetic steel sheet/brazing material part/electromagnetic steel sheet/brazing material part/elastic material
(6) Electromagnetic steel sheet/brazing material part/elastic material/brazing material part/electromagnetic steel sheet
(7) Electromagnetic steel sheet/brazing material part/electromagnetic steel sheet/adhesive part/elastic material/adhesive part/electromagnetic steel sheet/brazing material part/electromagnetic steel sheet
(8) Electromagnetic steel sheet/brazing material part/electromagnetic steel sheet/brazing material part/elastic material/brazing material part/electromagnetic steel sheet/brazing material part/electromagnetic steel sheet The laminate of structure (1) has an electromagnetic steel sheet layer containing two or more electromagnetic steel sheets, and satisfies only Condition A.

The laminate of structure (2) has an electromagnetic steel sheet layer consisting of one electromagnetic steel sheet, and also has an elastic material layer, and satisfies only Condition B.

The laminate of structure (3) has an electromagnetic steel sheet layer containing two or more electromagnetic steel sheets, and also has an elastic material layer, and satisfies only Condition A.

Each of the laminates of structures (4) and (5) has an electromagnetic steel sheet layer containing two or more electromagnetic steel sheets, and also has an elastic material layer, and satisfies both Condition A and Condition B.

The laminate of structure (6) has a plurality of electromagnetic steel sheet layers each consisting of one electromagnetic steel sheet, and also has an elastic material layer, and satisfies only Condition B.

The laminate of structure (7) has a plurality of electromagnetic steel sheet layers each containing two or more electromagnetic steel sheets, and also has an elastic material layer, and satisfies only Condition A.

The laminate of structure (8) has a plurality of electromagnetic steel sheet layers each containing two or more electromagnetic steel sheets, and also has an elastic material layer, and satisfies Condition A and Condition B.

In the laminate that satisfies the above-mentioned Condition A and/or Condition B, there is no particular limitation with respect to the brazing material forming the brazing material part provided between two or more electromagnetic steel sheets, or between the electromagnetic steel sheet layer and the elastic material layer as long as the brazing material is capable of forming a metallic bond with the electromagnetic steel sheet. Examples of such brazing materials include various brazing materials, such as silver braze, copper braze, nickel braze, iron braze, gold braze, aluminum braze, and titanium braze. Among the various brazing materials, a brazing material composed of nickel (Ni) as a major element (which may be abbreviated hereinafter as "Ni-based brazing material") or a brazing material composed of iron (Fe) as a major element (which may be abbreviated hereinafter as "Fe-based brazing material") is preferred for forming the brazing material part in the present invention.

In the present invention, preferably, the brazing material part composed of the Ni-based brazing material contains Ni as a major element, together with at least one element selected from the group consisting of Cr, Si, Fe, B, P, C, Cu, and Mo. Examples of brazing materials that can form such a brazing material part include brazing materials having compositions of BNi-1, BNi-1A, BNi-2, BNi-3, BNi-4, BNi-5, BNi-6, BNi-7 and the like described under JISZ3265. In general, the brazing material composed of Ni as a major element have been used for metal-to-metal brazing, and have been considered unsuitable for brazing the commercially available electromagnetic steel sheets provided with an oxide-based coating as described above. Contrary to the above, when the present inventors bonded the electromagnetic steel sheets by using the brazing material containing Ni as a major element, together with at least one element selected from the group consisting of Cr, Si, Fe, B, P, C, Cu, and Mo, surprisingly, strong bond was formed. Although the reason for this is not clear, formation of a strong metallic bond, i.e., an alloyed region of Fe derived from the electromagnetic steel sheet and Ni derived from the brazing material part, was observed between the electromagnetic steel sheet and the brazing material.

The above-mentioned alloyed region can be confirmed by elemental analysis of the cross-section in the thicknesswise direction of the power generating magnetostrictive element. There is no particular limitation with respect to the method for the elemental analysis of the cross-section of the power generating magnetostrictive element, but the analysis can be performed by elemental analysis of the cross-section with a scanning electron microscope (SEM) equipped with an energy dispersive X-ray spectrometer device (EDS) (which may be abbreviated hereinafter as "SEM-EDS"), and/or a line analysis with an electron probe microanalyzer (EPMA). In the present invention, the alloyed region is confirmed and measured by the elemental analysis of the cross-section of the magnetostrictive power generation element with the SEM-EDS. Examples of the SEM-EDS device include JSM-7000F available from JEOL (EDS: JED-2300).

Figure 9:
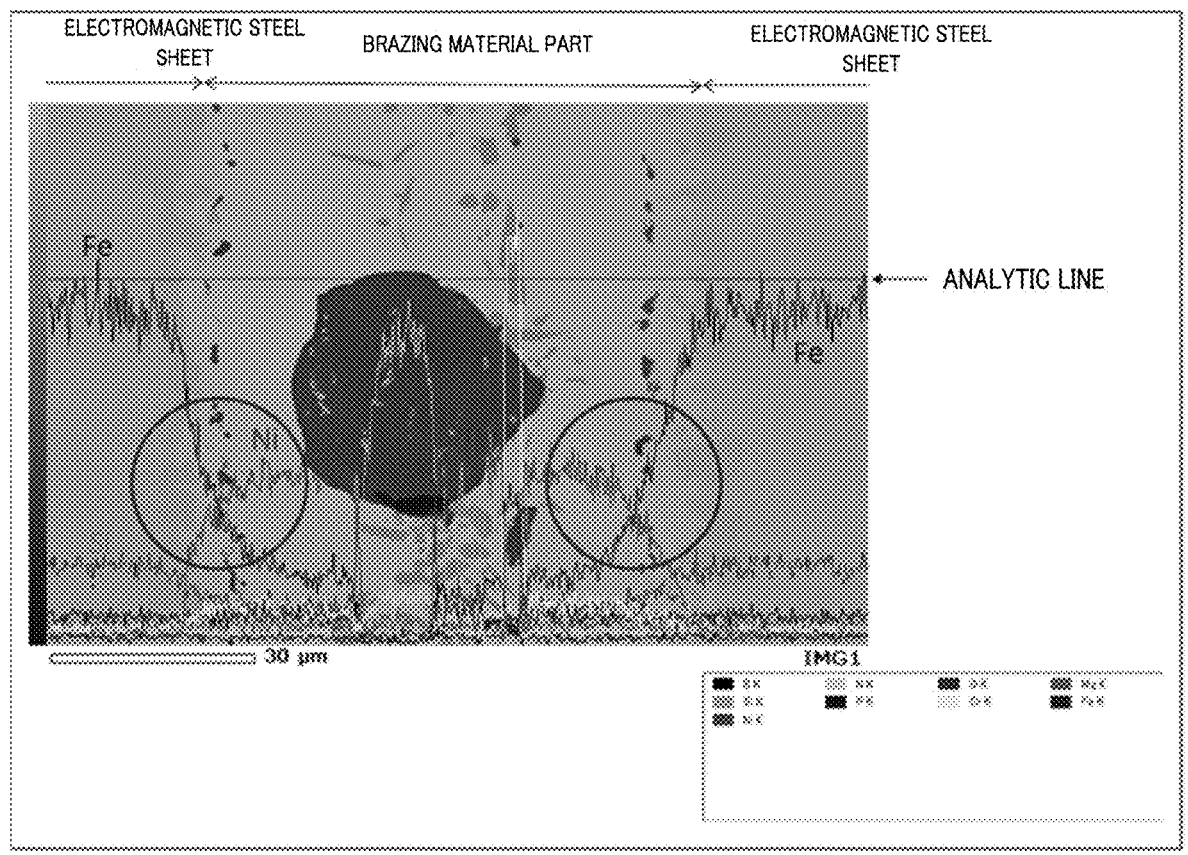
FIG. 9 is a result of an elemental analysis of a cross-sectional structure of a magnetostrictive element of Example 14.

As an example of the result of the elemental analysis with the SEM-EDS, analytic result of a power generating magnetostrictive element produced in Example 14 of the present application is shown in FIG. 9. In FIG. 9, the concentration profile of Fe is high inside the electromagnetic steel sheet, but is very low in the center portion of the brazing material part. On the other hand, the concentration profile of Ni is high inside the brazing material part, but is very low in the center portion of the electromagnetic steel sheet. The reason for this is that the Ni-based brazing material used contains only a small amount (3 mass %) of Fe, and the electromagnetic steel sheet does not contain Ni.

The concentrations of Fe and Ni can be determined by performing point analysis with the EDS at a plurality of positions on the analytic line shown in FIG. 9 and quantifying the composition at a particular portion. In FIG. 9, the circle represents a part where Fe derived from the electromagnetic steel sheet and the Ni derived from Ni-based brazing material part are alloyed.

Further, in the alloyed region of Fe derived from the electromagnetic steel sheet and Ni derived from the brazing material part, a region where the Fe concentration is higher than the Fe concentration of the brazing material is present at the side of the brazing material part. In this case, the increase of the Fe concentration on the side of the brazing material part is due to diffusion of Fe from the side of the electromagnetic steel sheet to the side of the brazing material part, and the amount of Fe diffusing into the brazing material part is preferably 0.2 mass % or more for forming an alloy between the diffused Fe and Ni of the brazing material part. Therefore, the region where the Fe concentration is [the concentration of Fe contained in the brazing material used]+0.2 mass % or more is the region where Fe derived from the electromagnetic steel sheet and Ni derived from the brazing material part are alloyed. Preferably, the amount of Fe that diffuses from the side of the electromagnetic steel sheet to the side of the brazing material part is 0.5 mass % or more, and it is considered that the greater the amount of diffusion, the greater the alloyed region and the stronger the formed bond.

Likewise, on the electromagnetic steel sheet side, there is a region where the Ni concentration is higher than the Ni concentration of the electromagnetic steel sheet. The increase of the Ni concentration on the side of the electromagnetic steel sheet is due to the diffusion of Ni from the side of the brazing material part to the electromagnetic steel sheet, and the amount of Ni diffusing into the electromagnetic steel sheet is preferably 0.2 mass % or more for forming an alloy between the diffused Ni and Fe of the electromagnetic steel sheet. Therefore, the region at the side of the electromagnetic steel sheet where the Ni concentration is [the Ni concentration of the electromagnetic steel sheet used]+0.2 mass % or more is the region where Fe derived from the electromagnetic steel sheet and Ni derived from the brazing material part are alloyed. Preferably, the amount of Ni that diffuses from the side of the brazing material part to the electromagnetic steel sheet is 0.5 mass % or more, and it is considered that the greater the amount of diffusion, the greater the alloyed region and the stronger the formed bond.

In the present invention, width L of the alloyed region is preferably 2 µm or more. Width L of 2 µm or more is sufficient for achieving a high bonding strength. The larger the width L, the higher the bonding strength, and therefore it is more preferable that the width L is 4 µm or more. The width L of the alloyed region can be determined with the EDS by performing point analysis at a plurality of positions of the contact surface between the electromagnetic steel sheet and the Ni-based brazing material part, quantifying the elemental composition, and determining the alloyed region (i.e., the region where the Fe concentration on the side of the brazing material part is [the Fe concentration of the brazing material used]+0.2 mass % or more, and the region where the Ni concentration on the side of the electromagnetic steel sheet is [Ni concentration of the electromagnetic steel sheet used]+0.2 mass % or more) on the basis of the obtained Fe concentration and Ni concentration. Note that whether or not the width L of the alloyed region is 2 µm or more can be confirmed on the basis of the Fe and Ni concentration profiles by selecting, from an inner portion of the contact surface, any 2 µm or more region including a portion where the Fe concentration and the Ni concentration are close to each other, and quantifying the elemental composition of the selected region.

In addition, in the case where the alloyed region is present on both the side of the electromagnetic steel sheet and the side of the Ni-based brazing material part, the alloyed region at the side of the Ni-based brazing material part and the alloyed region at the electromagnetic steel sheet side are continuous, and when the sum of the width L1 of the alloyed region at the side of the Ni-based brazing material part and the width L2 of the alloyed region at the side of the electromagnetic steel sheet is 2 µm or more, such alloyed region is sufficient to achieve a high bonding strength. Further, each of the width L1 and the width L2 are preferably 1 µm or more, and more preferably 2 µm or more. The reason for this is that the larger width L1 and the width L2, the higher the bonding strength. Note that since the brazing material becomes the liquid phase during brazing, Fe of the electromagnetic steel sheet are more likely to diffuse into the brazing material part which is in the liquid phase, and accordingly, the width L1 tends to be greater than the width L2.

In the power generating magnetostrictive element of the present invention, in the case where there are a plurality of contact surfaces between the electromagnetic steel sheet and the brazing material part formed of the Ni-based brazing material, the alloyed region is preferably formed in at least one of the contact surfaces. More preferably, the alloyed region is formed in 70% or more of the total contact surfaces, still more preferably in the entire contact surfaces.

Further, the brazing material composed of Ni as a major element is also excellent in corrosion resistance, and contributes to the durability of the magnetostrictive power generation device.

In the present invention, the brazing material part composed of the Fe-based brazing material contains Fe as a major element, together with at least one element selected from the group consisting of Cr, Ni, Si, B, P, C, Cu, and Mo, and also contains at least one oxide selected from the group consisting of a Mg oxide, a Cr oxide, and a Si oxide. Examples of the brazing materials capable of forming such a brazing material part include Fe—Cr—Ni—Si—P—Mo-based brazing materials, Fe—Ni—B—C-based brazing materials and Fe—B—Si-based brazing materials. Examples of the specific compositions are as follows.

Fe—20% Cr—30% Ni—5.0% Si—8.0% P—2.0% Mo
Fe—20% Cr—20% Ni—5.0% Si—8.0% P—2.0% Mo
Fe—20% Cr—15% Ni—5.0% Si—8.0% P—2.0% Mo
Fe—32% Ni—13% B—1.0% C
Fe—14% B—2.5% Si—1.0% C—1.2% P

When the present inventors performed the bonding with the electromagnetic steel sheet by using the above-described brazing material composed of Fe as a major element, surprisingly, strong bond was formed. The reason for this is not clear, but may be considered as follows. Typically, the Fe content of the electromagnetic steel sheet is greater than the Fe content of the brazing material. In the case where the electromagnetic steel sheet and the Fe-based brazing material are bonded together by heat brazing process and the Fe concentration profile of the bonding cross-section in the thicknesswise direction of the sheet was measured by the elemental analysis described above, the Fe concentration profile changes continuously from the electromagnetic steel sheet to the Fe-based brazing material in the vicinity of the bonding interface. Such a continuous change in the Fe concentration enables an obtainment of a sufficient bonding strength because Fe of the electromagnetic steel sheet and Fe of the brazing material are mixed together at the bonding portion.

The brazing material part using either one of the Ni-based brazing material and the Fe-based brazing material, which are the brazing materials preferred in the present invention, preferably further contains at least one oxide selected from the group consisting of a Mg oxide, a Cr oxide, and a Si oxide. These oxides are derived from the oxide coating that was present on the surface of the electromagnetic steel sheet and stripped off by the brazing material, and then, incorporated into the brazing material. Incorporation of the oxide from the oxide coating of the electromagnetic steel sheet into the brazing material is considered to form a strong metallic bond between the electromagnetic steel sheet and the brazing material. Containing any one of the Mg oxides, Cr oxides and Si oxides is satisfactory, but two or more of Mg oxides, Cr oxides and Si oxides may be contained. These oxides are less deformable than metals and, therefore, in comparison with the magnetostrictive element comprising the brazing material part without an oxide, the magnetostrictive element comprising the brazing material part containing the oxide is less deformable when a bending strain is applied through vibration As a result, there is a further suppression of the mitigation of the strain between the layers of the laminate, and improves the power generation. Note that the oxide may be present in the brazing material as a single oxide or as a composite oxide containing at least one of the above-mentioned oxides.

Further, the oxide in the brazing material part is preferably present in a bulk form. Presence of the oxide in a bulk form (i.e., bulky oxide) in the brazing material part is likely to prevent the deformation of the brazing material part. There is no particular limitation with respect to the method for confirming the presence of the bulky oxide in the brazing material part, but the presence of bulky oxide can be confirmed by cutting the laminate in a direction perpendicular to the plate surface and observing the brazing material part in the cross-section with a scanning electron microscope (SEM) or the like. At this time, the maximum diameter of the oxides present in the observed field of view may be measured and used as the size of the bulky oxide. Preferably, the size of the bulky oxide is 90 μm or less, more preferably 70 μm or less. The size of the bulky oxide being 90 μm or less is preferable in view of less separation of the oxide and the brazing material matrix phase. In addition, the size of the oxide measured in the thicknesswise direction of the laminate is preferably 95% or less, more preferably 70% or less, based on the thickness of the brazing material part. The size of the oxide being 95% or less of the thickness of the brazing material part is preferred in view of less separation of the oxide and the brazing material matrix phase.

Further, the brazing material may contain Cu and Mo for the purpose of improving the strength of the brazing material itself.

In the case where the magnetostrictive element comprises a plurality of brazing material parts, all of the plurality of the brazing material parts may be formed of the same brazing material, or the plurality of the brazing material parts may be a mixture of parts formed of different brazing materials.

There is no particular limitation with respect to the thickness of the brazing material part as long as the brazing material part is capable of bonding the electromagnetic steel sheet, but the thickness is preferably 5 to 100 μm. The thickness of the brazing material part being smaller than 5 μm may result in an insufficient metallic bond between the brazing material and the electromagnetic steel sheet. In particular, in the case where the electromagnetic steel sheet comprises an oxide coating at its surface, the thickness of the brazing material part being smaller than 5 μm may reduce the action of peeling off the oxide coating from the electromagnetic steel sheet and incorporating it into the brazing material, thereby forming only insufficient amount of metallic bond between the brazing material and the electromagnetic steel sheet, and reducing the bonding strength. Even when the thickness of the brazing material part exceeds 100 μm, no further effects on the strength and durability of the bond is observed.

Further, the brazing material part may contain voids in an amount of 50% or less by volume. The voids have a strain mitigation effect, and when the volume fraction is 50% or less, the durability of the brazing material is further improved. Even when the volume fraction of voids is 0%, there is no problem about durability. The voids in the brazing material part also cause the mitigation of strain between the layers of the laminate, and if the voids are 50% or less by volume, the effect on the power generation can be minimized. A possible reason for this is that more than 50% of the volume fraction between the layers is occupied by the metallic and rigid brazing material which are firmly bonded to the electromagnetic steel sheet.

A method for manufacturing the magnetostrictive element is briefly described below. First, a portion to be bonded with the brazing material is produced. The electromagnetic steel sheet (and the elastic material) is cut out by shearing in a predetermined size to prepare necessary number of electromagnetic steel sheets (and the elastic materials). Next, the desired number of electromagnetic steel sheets (and the elastic materials) are stacked in the desired order while sandwiching the brazing material between the sheets. For example, the brazing material may be a foil-shaped material with a foil thickness of about 25 μm to 75 μm, or powder braze with a particle size of 150 μm or less may be used. In the case where the foil-shaped brazing material is used, the brazing material is also cut out in the same size as that of the electromagnetic steel sheet (and the elastic material), and stacked with the electromagnetic steel sheet (and the elastic material). In the case where the powder braze is used, the electromagnetic steel sheet and/or the elastic material are stacked after applying the powder braze. The electromagnetic steel sheet layer containing two or more electromagnetic steel sheets can be produced by stacking the electromagnetic steel sheet, the elastic material and the brazing material in the order of the electromagnetic steel sheet, the brazing material, and the electromagnetic steel sheet. In addition, a laminate containing the electromagnetic steel sheet layer and the elastic material layer can be produced by stacking the electromagnetic steel sheet, the brazing material, and the elastic material in this order.

For the brazing, the above-mentioned laminated (stacked) material is subjected to a heating process. A single laminate may be subjected to the heating process, but plurality of laminates may be stacked and subjected to the heating process. For example, a stack of plurality of laminates each obtained by stacking the electromagnetic steel sheet, the brazing material and the electromagnetic steel sheet in this order, such as a stack of electromagnetic steel sheet/brazing material/electromagnetic steel sheet/electromagnetic steel sheet/brazing material/electromagnetic steel sheet/ . . . electromagnetic steel sheet/brazing material/electromagnetic steel sheet, or a stack of plurality of laminates each obtained by stacking the electromagnetic steel sheet, the brazing material and the elastic material in this order, such as electromagnetic steel sheet/brazing material/electromagnetic steel sheet/brazing material/elastic material/ . . . electromagnetic steel sheet/brazing material/electromagnetic steel sheet/brazing material/elastic material, can be subjected to the heat treatment. Since the oxidation coating is present on the surface of the electromagnetic steel sheet, even when the heating process for brazing is performed in the state where two electromagnetic steel sheets or the electromagnetic steel sheet and the magnetic material are in contact with each other, the brazed laminate can be easily separated after the heating process. However, in order to facilitate the separation, the laminates may be stacked after spraying a releasing agent on the surface of the electromagnetic steel sheet.

The heating process for brazing is performed under an inert gas (such as Ar), atmosphere, or in a vacuum, preferably in a furnace capable of heating in a vacuum. The brazing temperature differs depending on the brazing material used, but it is preferably from the melting point of the brazing material to +70° C. or lower. Even when the brazing temperature exceeds the melting point of the brazing material+70° C., there is no further improvement in the strength and durability of the brazing part. The time of the heating process is preferably about 5 to 120 minutes. In the case where the number of layers in the laminate is large, the inner part of the laminate may not have reached a predetermined temperature even after the temperature of the furnace has reached the predetermined temperature and, therefore, some time is necessary for the temperature of the laminate to become uniform. Accordingly, the inside of the laminate can be heated uniformly by keeping the processing temperature for a long time, e.g., 120 minutes.

Further, a load is applied to the laminate during the heating process for brazing. There is no particular limitation with respect to the load per unit area of the laminate, but is preferably 0.1 g/mm$^2$ to 5 g/mm$^2$. The load smaller than 0.1 g/mm$^2$ is not preferable because the void in the brazing material part may exceed 50% and the bonding strength may be reduced. In addition, application of a load greater than 5 g/mm$^2$ does not cause any significant change in the brazing material part. To apply a load to the laminate, a hot pressing that can be used in a vacuum or under an inert gas, such as Ar, atmosphere can be used.

The laminate in which all layers are bonded through the brazing material part can be produced by the above-mentioned method. In the case where a material other than the brazing material is used for bonding the layers, a layer containing the brazing material part produced by the above-mentioned method and another layer (for example, a laminate in which a plurality of layers is bonded with an elastic material plate, an adhesive or the like) are bonded by a method other than the brazing, such as an adhesive.

As an index for evaluating the performance of the magnetostrictive element, magnetic flux density change ΔB of the element that is caused by an application of an external stress to the magnetostrictive element may be used. ΔB (unit: mT or T) can be determined by the following method.

A magnetostrictive element with cross-sectional area S is inserted to a coil with winding number N, and external stress is applied thereto. In this instance, when the magnetic flux density change ΔB occurs during time Δt, voltage of V=−N (S·ΔB/Δt) is generated in the coil. Accordingly, ΔB can be determined as a time integral value of the voltage signal generated in the coil. The performance index of the magnetostrictive vibration power generation element can be evaluated as the total voltage generated during Δt. That is, the performance can be evaluated as the magnetic flux density change ΔB which is a time integral value of the voltage. The measurement of ΔB can be made by connecting the voltage generated in the coil to a flux meter. The detailed measurement method and the measurement device of ΔB (unit: mT or T) will be described in the following Examples.

2. Magnetostrictive Power Generation Device

The present invention relates to a magnetostrictive power generation device comprising the above-described power generating magnetostrictive element of the present invention and a frame connected to the power generating magnetostrictive element.

The structure of the magnetostrictive power generation device of the present invention is not limited as long as it comprises the above-described magnetostrictive element of the present invention, i.e., an magnetostrictive element formed of a laminate comprising at least one electromagnetic steel sheet layer, in which the electromagnetic steel sheet layer comprises at least one electromagnetic steel sheet, and the laminate satisfies at least one of the above-described conditions A and B. Therefore, it is possible to adopt a structure similar to that of a power generator using a reverse magnetostrictive effect in which a conventional magnetostrictive material (FeGa alloy, FeCo alloy, FeAl alloy or the like) is used for the magnetostrictive part.

The magnetostrictive power generation device of the present invention further comprises a frame connected to the magnetostrictive element. The "frame" of the magnetostrictive power generation device in the present invention is a part bonded to a magnetostrictive element, an anchor, and a magnet and forming the main body of the magnetostrictive power generation device. Further, in the present invention, the frame is preferably continuous with the magnetostrictive element, and at least a part of the frame is composed of the laminate forming the magnetostrictive element. This means that a portion of the frame adjacent to at least the magnetostrictive element (a portion in the vicinity of the coil where the coil is not wound) is integrated with the magnetostrictive element, and the entire frame need not be integrated with the magnetostrictive element.

A magnetostrictive power generation device in which at least a part of the frame is composed of the laminate forming the magnetostrictive element is described below.

The magnetostrictive element in the device of the present invention means an element that comprises a magnetostrictive part formed of an electromagnetic steel sheet and a stress control part formed of an elastic material, and is capable of generating power based on the reverse magnetostriction of the magnetostrictive part (i.e., generation of a magnetic field due to the shape change (warpage) of the magnetostrictive part). In terms of the structure, the magnetostrictive element is a region where a detection coil is wound around the laminate comprising the magnetostrictive part and the stress control part and which region contributes to power generation. In the actual power generation device, the adjacent portion outside the region where the coil is wound also contributes to power generation, but only the region where the coil is wound is defined as the magnetostrictive power generation element.

In the frame of the magnetostrictive power generation device, there is a region composed of the laminate forming the magnetostrictive element (i.e., a laminate comprising an electromagnetic steel sheet and optionally an elastic material) which is located at each end of the magnetostrictive element (in a manner protruding from the coil). The length of this region is equal to or more than 50% of the length corresponding to the length of the coil, and is preferably equal to or more than the length corresponding to the length of the coil. In such a magnetostrictive power generation device, since a junction between the power generating magnetostrictive element and the frame is not present in or near the magnetostrictive element, concentration of stress on the junction is less likely to occur when a successive bending strain is applied to the power generating magnetostrictive element, and the durability of the device is improved. In addition, the laminate comprising the electromagnetic steel sheet (and the elastic material) is preferably extending from the magnetostrictive element to a position where an anchor for applying a bending strain to the magnetostrictive part is joined. Such a structure enables an efficient transmission of the bending strain generated by the vibration of the anchor to the magnetostrictive element.

Further, the portion of the frame composed of the laminate forming the magnetostrictive element is preferably 20% or more, more preferably 40% or more, of the total length of the frame. When 20% or more of the total length of the frame is composed of the above-mentioned laminate, the bonding surface between the two or more electromagnetic steel sheets, and/or between the electromagnetic steel sheet and the elastic material contained in the electromagnetic steel sheet layer can be increased. As a result, In addition, since the continuity in the member constituting the magnetic circuit increases, generation of magnetic gap becomes reduced and enables easy adjustment of the bias magnetic field by the magnet, thereby further stabilizing the voltage.

In the case where only a part of the frame is composed of the laminate forming the magnetostrictive element, there is no particular limitation on the materials used for forming the remaining parts of the frame. Other steel sheets and elastic materials may be bonded to complete the frame. However, from a view point of durability of the device and ease of manufacture, the entire frame is preferably composed integrally with the electromagnetic steel sheet extending from the laminate forming the magnetostrictive element. In particular, in the case where the laminate forming the magnetostrictive element comprises the electromagnetic steel sheet layer and the elastic material layer, preferred is a configuration in which the electrical steel sheet forming the magnetostrictive part exists in the part corresponding to the magnetostrictive element and in the entire frame, and the elastic material forming the stress control part exists in a part of the frame and in the part corresponding to the magnetostrictive element; or a configuration in which the elastic material forming the stress control part exists in the part corresponding to the magnetostrictive element and in the entire frame, and the electrical steel sheet forming the magnetostrictive part exists in a part of the frame and in the part corresponding to the magnetostrictive element. In such a configuration where the electromagnetic steel sheet or elastic material constituting the magnetostrictive element extends throughout the entire frame, both the magnetostrictive element and the frame can be manufactured by producing a laminate containing the electrical steel sheet and the elastic material. Therefore, the manufacturing process can be simplified. Such a configuration is especially preferred because, when at least a portion of the electromagnetic steel sheet and the elastic material constituting the magnetostrictive element are extended to the fixation part for fixing the magnetostrictive power generation device to the vibration source or the like, the vibration from the vibration source or the like can be transmitted efficiently to the magnetostrictive element section.

In addition, the entire frame may be composed of the laminate forming the magnetostrictive element. In particular, in the case where the laminate forming the magnetostrictive element comprises the electromagnetic steel sheet layer and the elastic material layer, the laminate containing the electromagnetic steel sheet and the elastic material continuously forms both the magnetostrictive element and the frame, and there is absolutely no joint portion between the magnetostrictive element and the frame. Therefore, this configuration is preferred in view of durability. In addition, since the continuity in the member constituting the magnetic circuit increases, generation of magnetic gap becomes reduced and enables easy adjustment of the bias magnetic field by the magnet, thereby further stabilizing the voltage.

There is no particular limitation with respect to the dimensions of the frame including the magnetostrictive element, but in general, the length of the frame including the magnetostrictive element is 30 mm or more and 700 mm or less, preferably 60 mm or more and 500 mm or less, more preferably 120 mm or more and 300 mm or less. The width of a typical frame is 4 mm or more and 70 mm or less, preferably 6 mm or more and 50 mm or less, more preferably 8 mm or more and 30 mm or less. The dimensions of the frame may be reflected in the design according to the magnitude of electrical power required for operating the equipment.

There is no particular limitation with respect to the shape of the frame, and the frame may have a sheet shape or a shape having at least one bent portion, such as a C shape, a U shape, or a V shape. Note that in the present invention, the electromagnetic steel sheet with high toughness is used for the magnetostrictive element, and therefore not only a frame with the plate-shape, but also a frame with a curved portion, such as the U-shape, may be produced with the magnetostrictive material for forming the magnetostrictive element.

With respect to the dimensions of the magnetostrictive element in the magnetostrictive power generation device of the present invention, larger voltage can be obtained by using larger magnetostrictive element and increasing the number of turns of the coil in the power generation device. Therefore, there is no particular limitations with respect to the dimensions (the length of the region for winding the coil) of the magnetostrictive element, but in general, the length is 5 mm or more and 150 mm or less, preferably 10 mm or more and 100 mm or less, more preferably 20 mm or more and 70 mm or less.

There is no particular limitation with respect to the thickness of the electromagnetic steel sheet forming the electromagnetic steel sheet layer of the magnetostrictive element and the frame, but in general, the thickness is 0.2 mm or more and 10 mm or less. The magnetostrictive part with thickness of 0.2 mm or more is capable of increasing the change in the magnetic flux and is, thus, advantageous for increasing the generated voltage, and the thickness of 10 mm or less is advantageous for facilitating the design of rigidity suitable for vibration. The thickness of the electrical steel sheet in the laminate forming the magnetostrictive element and that in the laminate forming the frame may be the same or different.

There is no particular limitation with respect to the thickness of the elastic material forming the stress control part of the magnetostrictive element and the frame, but in general, the thickness is 0.02 mm or more and 50 mm or less, preferably 0.1 mm or more and 10 mm or less, more preferably 0.2 mm or more and 5 mm or less. The part corresponding to the magnetostrictive element with a thickness of 0.02 mm or more is advantageous for applying either one of the compression stress and tensile stress to the entire magnetostrictive part, and the thickness of 50 mm or less is advantageous for suppressing the prevention of the vibration of the magnetostrictive element. The thickness of the elastic material in the laminate forming the magnetostrictive element and that in the laminate forming the frame may be the same or different.

There is no particular limitation with respect to other configuration of the magnetostrictive power generation device of the present invention, and the device can be configured similarly to the conventional magnetostrictive power generation device. Specifically, in the device, a coil is wound around the magnetostrictive element and the device further includes a magnet, a frame (support), and an anchor attached to the frame. In such device, magnetic line of the magnet passes through the magnetostrictive element and applies a bias magnetic field to the magnetostrictive part. The vibration of the anchor causes the frame to vibrate and applies a tensile force and a compressive force to the magnetostrictive element. In this instance, the direction of the strain applied to the magnetostrictive part and the direction of the bias magnetic field applied to the magnetostrictive part are in a parallel relationship, and by changing the magnetization of the magnetostrictive element by the reverse magnetostrictive effect, induced current (or induced voltage) can be generated in the coil.

In the case where the magnetostrictive element is formed of the grain-oriented electrical steel sheet, the configuration of the device in which a bias magnetic field is applied in the <001> direction of the grain-oriented electrical steel sheet is preferable because a larger voltage can be obtained.

There is no particular limitation with respect to the size and number of magnets in the magnetostrictive power generation device, but may be selected in accordance with the configuration of the device. A permanent magnet is preferably used for the bias magnetic field generation because the permanent magnet can be miniaturized and control of its bias magnetic field is easy. Further, as the permanent magnet, NdFeB magnet capable of generating a larger bias magnetic field is preferred.

Next, a basic configuration of the magnetostrictive power generation device of the present invention is described with reference to FIGS. 6 to 8 which are schematic views of devices produced in Examples 11 to 13, but the device of the present invention is not limited to such devices.

Figure 6:
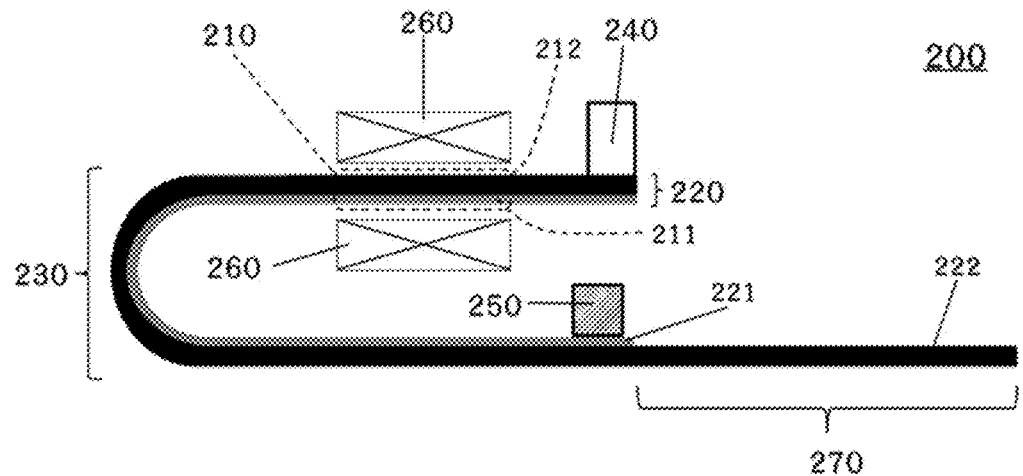
FIG. 6 is a schematic view illustrating a structure of a magnetostrictive power generation device of the present invention.

FIG. 6 is a schematic view of magnetostrictive power generation device 200 in which the entirety of the U-shaped frame is formed integrally with an elastic material extending from the stress control part. Magnetostrictive element 210 provided in magnetostrictive power generation device 200 is composed of laminate 220 in which electromagnetic steel sheet layer 221 and elastic material layer 222 (in Example 11, the grain-oriented electrical steel sheet and the SUS304, which is a non-magnetic material) are bonded through a brazing material part (not illustrated). In magnetostrictive element 210, electromagnetic steel sheet layer 221 serves as magnetostrictive part 211, elastic material layer 222 serves as stress control part 212, and detection coil 260 is loaded around magnetostrictive element 210. Further, the entirety of frame 230 is integrated with elastic material layer 222 extending from stress control part 212, and a part (approximately 71%) of the frame is composed of laminate 220. Device 200 further includes anchor 240 for applying a strain to magnetostrictive part 211 and magnet 250 for applying a bias magnetic field, and the device can be fixed at fixing part 270 on the vibration source and the like.

Figure 7:
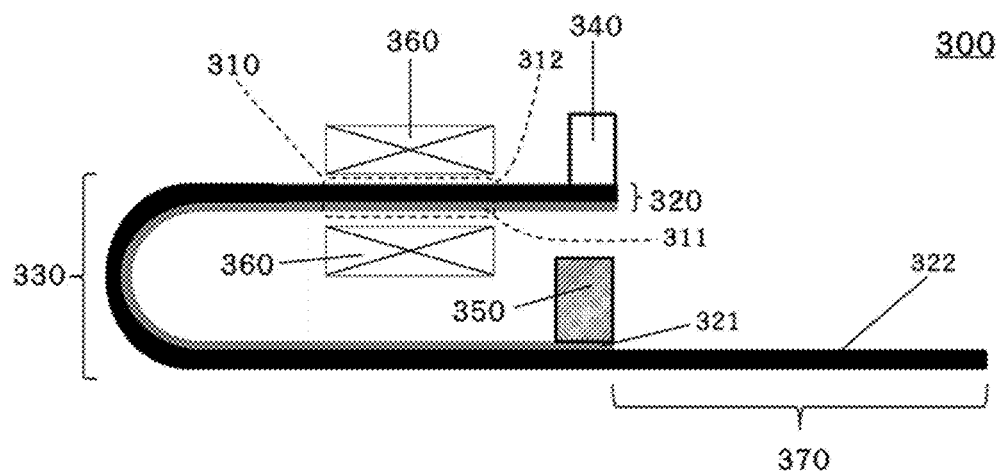
FIG. 7 is another schematic view illustrating a structure of the magnetostrictive power generation device of the present invention.

FIG. 7 is a schematic view of magnetostrictive power generation device 300 in which the entirety of the U-shaped frame is formed integrally with an elastic material extending from the stress control part. Magnetostrictive element 310 provided in magnetostrictive power generation device 300 is composed of laminate 320 in which electromagnetic steel sheet layer 321 and elastic material layer 322 (in Example 12, the grain-oriented electrical steel sheet and SUS430, which is a magnetic material) are bonded through a brazing material part (not illustrated). In magnetostrictive element 310, electromagnetic steel sheet layer 321 serves as magnetostrictive part 311, elastic material layer 322 serves as stress control part 312, and detection coil 360 is loaded around magnetostrictive element 310. Further, the entirety of frame 330 is integrated with elastic material layer 322 extending from stress control part 312, and a part (approximately 71%) of the frame is composed of laminate 320. Device 300 further includes anchor 340 for applying a strain to magnetostrictive part 311 and magnet 350 for applying a bias magnetic field, and the device can be fixed at fixing part 370 on the vibration source and the like.

Figure 8:
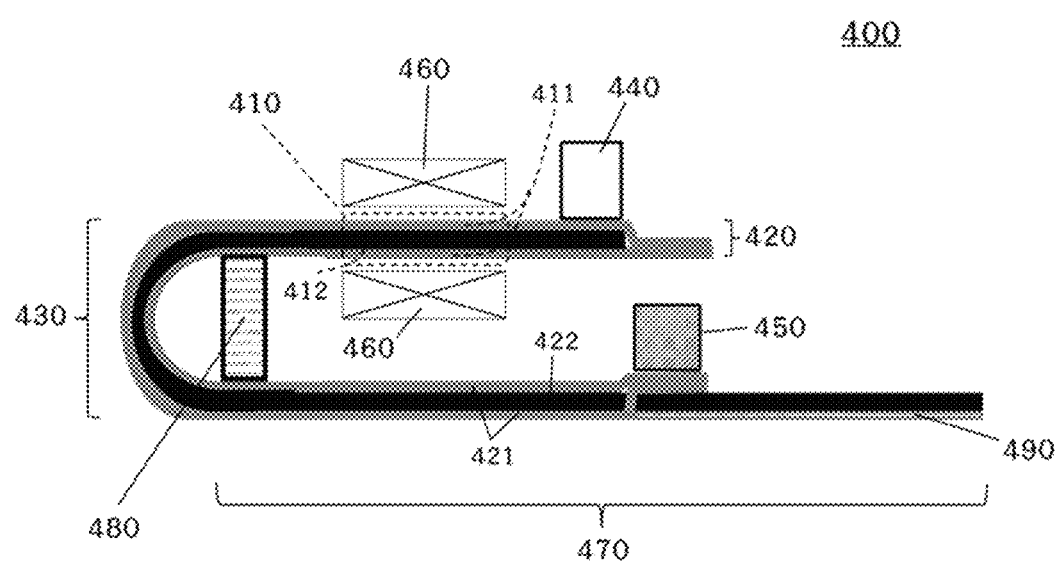
FIG. 8 is still another schematic view illustrating a structure of the magnetostrictive power generation device of the present invention.

FIG. 8 is a schematic view of magnetostrictive power generation device 400 in which a part of the U-shaped frame and the magnetostrictive element are composed of a laminate with the following laminate structure: electromagnetic steel sheet/brazing material part/elastic material/brazing material part/electromagnetic steel sheet. Magnetostrictive element 410 provided in magnetostrictive power generation device 400 is composed of laminate 420 with the following laminate structure: electromagnetic steel sheet/brazing material part/elastic material/brazing material part/electromagnetic steel sheet, namely a laminate of two electromagnetic steel sheet layers 421 and elastic material layer 422 (in Example 13, the grain-oriented electrical steel sheet and the SUS304 which is a non-magnetic material) bonded through a brazing material part (not illustrated). In magnetostrictive element 410, electromagnetic steel sheet layer 421 serves as magnetostrictive part 411, elastic material layer 422 serves as stress control part 412, and detection coil 460 is loaded around magnetostrictive element 410. Device 400 further includes anchor 440 for applying a strain to magnetostrictive part 411 and magnet 450 for applying a bias magnetic field. Further, frame 430 of device 400 is mainly composed of laminate 420 extending from magnetostrictive element 410, while in fixing part 470, electromagnetic steel sheet layer 421 at the outer side of U-shaped frame 430 is piercing through a hole provided in elastic material layer 422 and is in contact with the other electromagnetic steel sheet layer 421 disposed at the inner side of the frame. In addition, at the terminus of the side where anchor 440 is disposed, electromagnetic steel sheet layer 421 at the outer side of U-shaped frame 430 is in contact with the other electromagnetic steel sheet layer at the inner side of the frame. In this manner, the electromagnetic steel sheet can be efficiently magnetized with the magnet through the contact between the outer and inner electromagnetic steel sheets. For facilitating the vibration of the magnetostrictive element 410 in detection coil 460, device 400 is provided with pillar 480 provided inside the U-shaped portion. In addition, device 400 can be fixed on the vibration source and the like at fixing part 470, where SUS304 with the same thickness as that of the electromagnetic steel sheet is bonded as height adjustment plate 490.

Hereinafter, the present invention will be specifically described with reference to Examples, but the Examples should not be construed as limiting the present invention.

EXAMPLES

In the following examples, "%" is "mass %" unless otherwise noted.

Example 1

Comparison of Bonding Strength

As the electromagnetic steel sheet, the grain-oriented electrical steel sheet 35ZH115 with coating, available from NIPPON STEEL CORPORATION, was used. The thickness of the electromagnetic steel sheet was 0.35 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. The grain-oriented electrical steel sheet for the magnetostrictive part was obtained by annealing at 800° C. for two hours to remove the warpage caused during the cutting.

To produce a laminate (test piece) for the tensile test for measuring the bonding strength, two grain-oriented electrical steel sheets with a length of 40 mm and a width of 6.0 mm were stacked in a shifted manner by 20 mm in the longitudinal direction such that the bonding part is 20 mm in length and 6.0 mm in width.

As the brazing material for the bonding, a 25-μm thick amorphous foil of BNi-2 braze, or a foil of an active Ag braze (AgCuTi, 50 μm thick) was used. The compositions of the brazing materials were as follows.

Composition of BNi-2 braze: Ni-7.0% Cr-4.5% Si-3.0% B-3.0% Fe

Composition of active Ag braze: Ag-28% Cu-2% Ti-5% Sn

Each brazing foil was cut into 20 mm in length and 6.0 mm in width, and sandwiched between the laminate parts of the two grain-oriented electrical steel sheets, followed by a brazing treatment under the following conditions to obtain a laminate satisfying Condition A. For the BNi-2 foil, a brazing treatment was performed at 1050° C. for 10 minutes under vacuum. For the active Ag brazing foil, a brazing treatment was performed at 1000° C. for 10 minutes under vacuum.

For comparison, the same two grain-oriented electrical steel sheets as above were prepared, and the two grain-oriented electrical steel sheets were bonded at room temperature by using an epoxy adhesive instead of the brazing foil to obtain a laminate (test piece).

Further, one grain-oriented electrical steel sheet with a length of 40 mm and a width of 6.0 mm was also prepared as a test piece.

A tensile test was performed for each test piece prepared as described above. Specifically, a displacement-load curve was measured by holding both ends of the test piece. The displacement rate was set to 1 mm per minute, and the measurement was performed until breakage. The results are shown in FIG. 1 as displacement-load curves.

In the laminate bonded with the BNi-2 foil, no breakage occurred at the bonding part, but breakage occurred in the base material. In addition, in the laminate bonded with the active Ag brazing foil, breakage occurred in the bonding part, and the breakage strength was 50N or less, which is a value lower than that of the BNi-2 foil bonded laminate. On the other hand, breakage occurred in the bonding part in the laminate bonded with the epoxy adhesive. The value of the breakage strength was close to that of the base material, although there was almost no extension in comparison with the BNi-2 foil. The above-mentioned results show that the bonding by the BNi-2 foil, which resulted in the breakage of the base material, was superior to the bonding with the adhesive.

Example 2

Durability of Magnetostrictive Element Composed of Electromagnetic Steel Sheet/Brazing Material Part (Ni)/Electromagnetic Steel Sheet As the magnetostrictive material, the grain-oriented electrical steel sheet 35ZH115 with coating, available from NIPPON STEEL CORPORATION, was used. The thickness of the electromagnetic steel sheet was 0.35 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. The grain-oriented electrical steel sheet for the magnetostrictive part was obtained by annealing at 800° C. for two hours to remove the warpage caused during the cutting.

One BNi-2 amorphous foil with a length of 40 mm, a width of 6.0 mm, and a thickness of 25 μm was sandwiched as the brazing material between the two grain-oriented electrical steel sheets, and subjected to a brazing treatment at 1050° C. for 10 minutes under vacuum to obtain the magnetostrictive element that satisfies Condition A of the present invention. The magnetostrictive element was produced in two pairs.

For comparison, the magnetostrictive element in which the same two grain-oriented electrical steel sheets as described above were bonded to each other with an epoxy adhesive was produced in two pairs.

Figure 2:
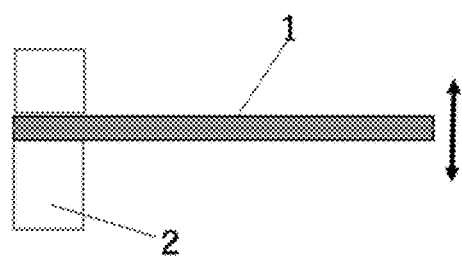
FIG. 2 is a schematic view of a device for testing the durability of a magnetostrictive element.

Vibration was applied to each pair of the produced magnetostrictive elements as illustrated in FIG. 2. Specifically, in the state where one end portion in the longitudinal direction of magnetostrictive element 1 is fixed with fixing part 2, the free end on the other side was repeatedly vibrated by a vertical motion. The element was vibrated 100,000 times under a condition of an amplitude of ±1.0 mm and a vibration frequency of 30 Hz.

Next, to measure $\Delta B$ under a bending strain, a carbon fiber reinforced plastic (CFRP) with a thickness of 0.5 mm was cut into 40 mm in length and 6.3 mm in width with the carbon fiber direction aligned with the longitudinal direction, and bonded to the magnetostrictive elements produced as described above (before vibration and after 100,000 vibrations) at room temperature by using an epoxy adhesive. Magnetic flux density change $\Delta B$ was measured by using the obtained magnetostrictive element with CFRP.

Figure 3:
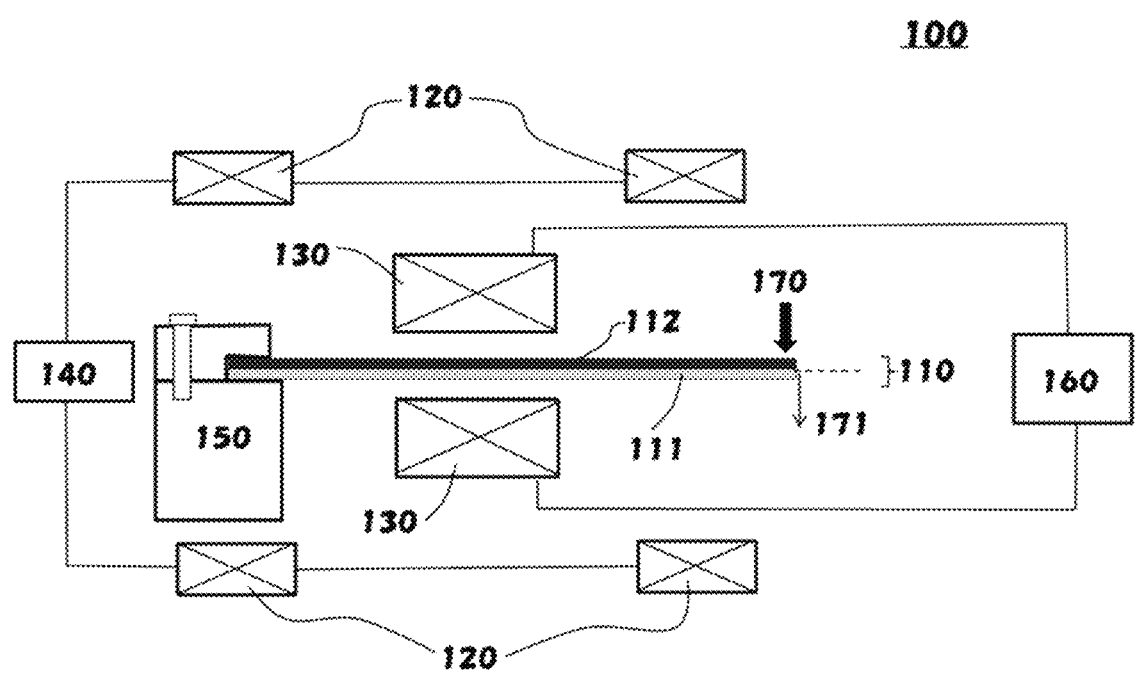
FIG. 3 is a schematic view of a unit for measuring magnetic flux density change ΔB by applying a bending strain to the magnetostrictive element of the present invention.

Measurement unit 100 illustrated in FIG. 3 that applies a bending strain to the magnetostrictive element was used for the measurement of magnetic flux density change $\Delta B$. FIG. 3 illustrates an example of a unit in which the left end portion of magnetostrictive element 110 containing magnetostrictive part 111 and stress control part 112 is fixed to fixation support base 150, and the right end portion is pushed downward to apply a bending strain.

In unit 100, downward pressure 170 is applied to the right end portion of magnetostrictive element 110 (i.e., by pushing). At this time, magnetostrictive part 111 (magnetostrictive material) is brought into a state where a compression strain is applied thereto, and the longer movement length 171 of the magnetostrictive part 111 at the time of pushing, the greater the compression strain. The pushing is performed by using a cylinder head of a micrometer, and depth Δh (movement length 171) of the pushing was set to 0.5 mm.

Further, in the measurement unit of FIG. 3, a Helmholtz-type coil was used as bias magnetic field coil 120, and electric current was supplied to the coil to apply a magnetic field to magnetostrictive element 110. The strength of the magnetic field was adjusted by the magnitude of direct current power source 140, and the strength of the magnetic field was calibrated beforehand with a Gauss meter. At this time, the magnetic field applied to magnetostrictive element 110 was set to 8000 A/m (100 Oe) for the evaluation. The magnetic flux change of magnetostrictive element 110 was detected as an induction voltage with detection coil 130 (the number of turns: 3500 turns), and the induction voltage was measured as a change of the magnetic flux with flux meter 160. Further, magnetic flux density change ΔB was determined by dividing the change of the magnetic flux by the number of turns of the detection coil and the cross-sectional area of the magnetostrictive material on the basis of the following Equation 1. The results are shown in Table 1.

[1]
$$\Delta B = -\frac{1}{(N \times S)} \int V dt \quad \text{(Equation 1)}$$

(where V represents the generated voltage, N represents the number of turns of the coil, and S represents the cross-sectional area of the magnetostrictive part)

Note that magnetic flux density change ΔB obtained by this measurement method is the time integral of the voltage change, and therefore does not depend on the velocity of the strain applied.

TABLE 1

| | Configuration of Magnetostrictive Element | ΔB (T) Reduction Rate (%) |
|---|---|---|
| Inventive Example 1 | The Electromagnetic Steel Sheet/Brazing Material Part (Ni)/Electromagnetic Steel Sheet | −4.7% |
| Comparative Example 1 | Electromagnetic Steel Sheet/Adhesive Part/Electromagnetic Steel Sheet | −12.5% |

As is clear from the result of Table 1, with respect to the magnetostrictive element of Inventive Example 1 satisfying Condition A by bonding two electromagnetic steel sheets by brazing, the reduction of ΔB was reduced and the durability was improved in comparison with the magnetostrictive element of Comparative Example 1 in which the sheets are bonded with an adhesive.

Example 3

Cross-Sectional Structure of Brazing Material Part: Magnetostrictive Element Composed of Electromagnetic Steel Sheet/Brazing Material Part/Electromagnetic Steel Sheet As the magnetostrictive material, the grain-oriented electrical steel sheet 35ZH115 with coating, available from NIPPON STEEL CORPORATION, was used. The thickness of the electromagnetic steel sheet was 0.35 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. A grain-oriented electrical steel sheet for the magnetostrictive element was obtained by annealing at 800° C. for two hours to remove the warpage caused during the cutting.

One BNi-2 amorphous foil with a length of 40 mm, a width of 6.0 mm, and a thickness of 50 μm was sandwiched as the brazing material between the obtained two grain-oriented electrical steel sheets, and subjected to a brazing treatment at 1050° C. for 10 minutes under vacuum to obtain a magnetostrictive element that satisfies Condition A (i.e., with a brazing material part between two electromagnetic steel sheets).

The obtained magnetostrictive element was cut in the widthwise direction, and the cross-sectional structure was observed with the SEM-EDS (JEOLJSM-7000F). The result is shown in FIG. 4.

Figure 4:
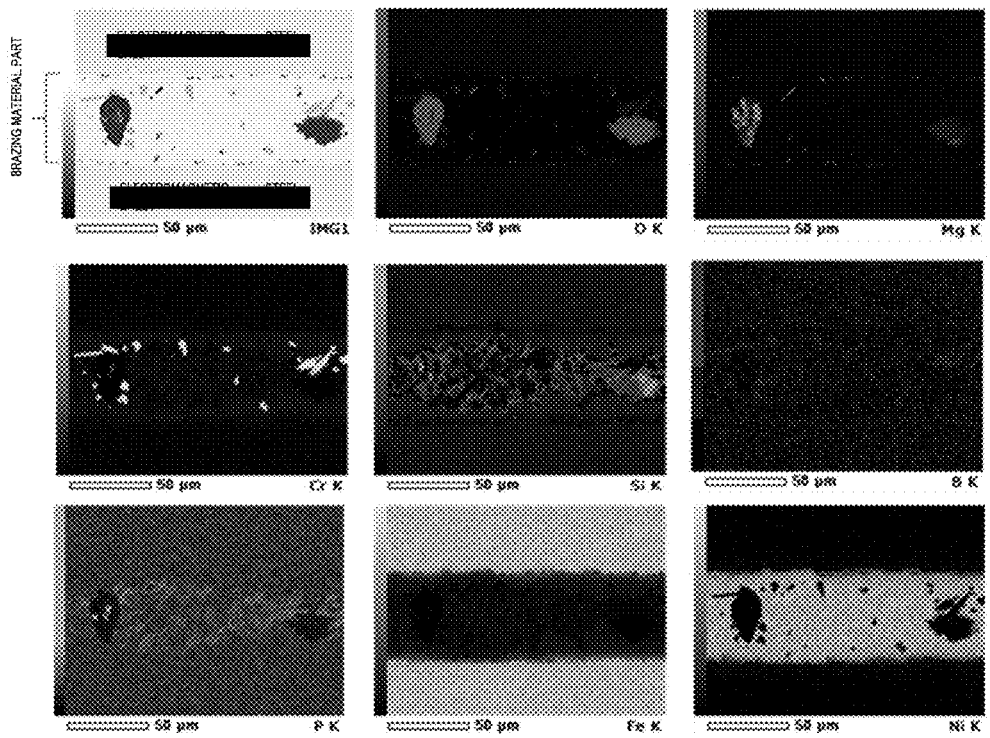
FIG. 4 is a result of an observation of a cross-sectional structure of the magnetostrictive element of the present invention with a SEM-EDS.

As is clear from FIG. 4, when the electromagnetic steel sheet provided with the oxide film is brazed using the brazing material composed of Ni as a major element, no oxide layer is seen in the cross-section. The oxide film is considered to be peeled by the brazing material and incorporated into the brazing material. As a result, the electromagnetic steel sheet and the brazing material formed a metallic bond mainly by Fe and Ni.

Further, the measurement of the maximum diameter of the oxides seen in the brazing material part in FIG. 4 shows that there were bulky Mg oxides with a size of approximately 0.3 μm to approximately 63 μm, bulky Cr oxides with a size of approximately 0.3 μm to approximately 20 μm, and bulky Si oxides with a size of approximately 0.3 μm to approximately 20 μm. Further, there were composite oxides of Si oxides and Mg oxides.

Example 4

Cross-Sectional Structure of Brazing Material Part: Magnetostrictive Element Composed of Electromagnetic Steel Sheet/Brazing Material Part/Elastic Material As the magnetostrictive material, the grain-oriented electrical steel sheet 35ZH115 with coating, available from NIPPON STEEL CORPORATION, was used. The thickness of the electromagnetic steel sheet was 0.35 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.1 mm in width. A grain-oriented electrical steel sheet for the magnetostrictive element was obtained by annealing at 800° C. for two hours to remove the warpage caused during the cutting.

A cold-rolled plate of SUS304, which is a non-magnetic material, with a thickness of 0.5 mm was used as the elastic material. After cutting into a size of 40 mm in length and 6.1 mm in width, the SUS304 was held at 1050° C. for 1 minutes under vacuum, followed by solution heat treatment through gas quenching to remove the effects of warpage caused by cutting, and obtain the non-magnetic material for the stress control part.

One BNi-2 amorphous foil with a length of 40 mm, a width of 6.1 mm, and a thickness of 38 μm was sandwiched as the brazing material between one grain-oriented electrical steel sheet and the SUS304, and subjected to a brazing treatment at 1050° C. for 10 minutes under vacuum to obtain a magnetostrictive element that satisfies Condition B (i.e., with the brazing material part between the electromagnetic steel sheet and the elastic material).

The obtained magnetostrictive element was cut in the widthwise direction, and the cross-sectional structure was observed with the SEM-EDS (JEOLJSM-7000F). The result is shown in FIG. 5.

Figure 5:
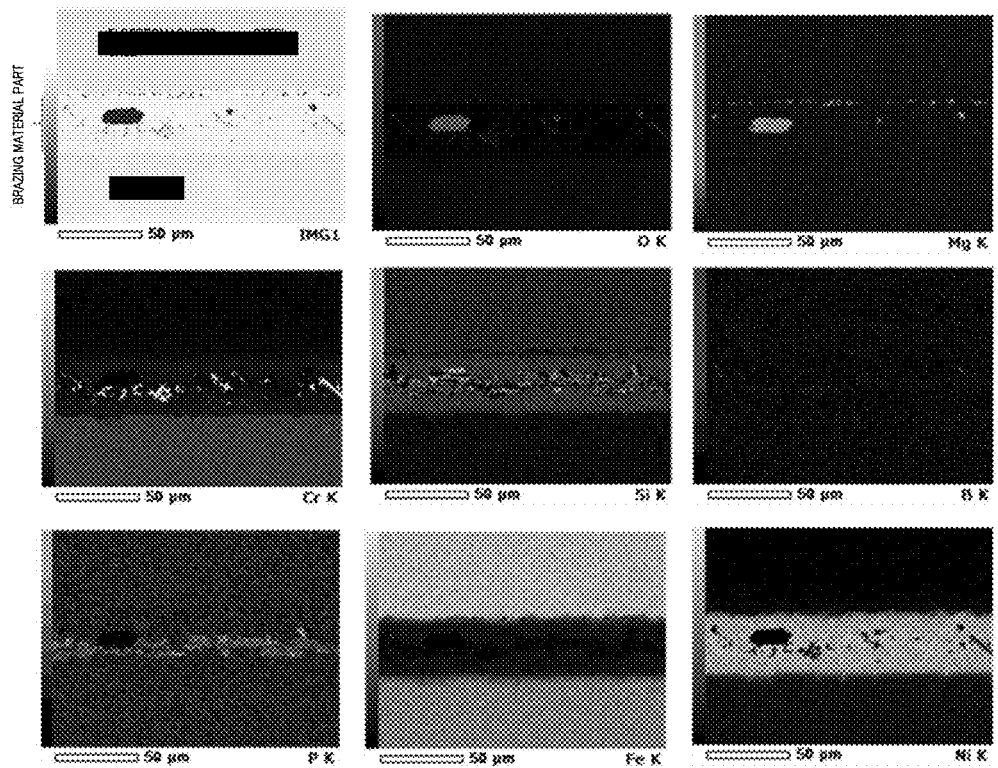
FIG. 5 is a result of an observation of a cross-sectional structure of another magnetostrictive element of the present invention with a SEM-EDS.

As is clear from FIG. 5, when the electromagnetic steel sheet provided with the oxide film is brazed using the brazing material composed of Ni as a major element, no oxide layer is seen in the cross-section. The oxide film is considered to be peeled off by the brazing material and incorporated into the brazing material. As a result, the electromagnetic steel sheet and the brazing material formed a metallic bond mainly composed of Fe and Ni.

Further, the measurement of the maximum diameter of the oxides seen in the brazing material part in FIG. 5 shows that there were bulky Mg oxides with a size of approximately 0.3 μm to approximately 20 μm and bulky Cr oxides with a size of approximately 0.3 μm to approximately 20 μm. In addition, there were also composite oxides of Si oxides and Mg oxides. Further, the SUS304 and the brazing material formed a metallic bond composed mainly of Fe and Ni.

Example 5

ΔB of Magnetostrictive Element Composed of Grain-Oriented Electrical Steel Sheet/Brazing Material Part/SUS304

As the magnetostrictive material, the grain-oriented electrical steel sheet 27ZH100 with coating, available from NIPPON STEEL CORPORATION, was used. The thickness of the electromagnetic steel sheet was 0.27 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 5.9 mm in width. A grain-oriented electrical steel sheet for the magnetostrictive element was obtained by annealing at 800° C. for two hours to remove the warpage caused during the cutting.

A cold-rolled plate of SUS304, which is a non-magnetic material, with a thickness of 0.5 mm was used as the elastic material. After the cutting into a size of 40 mm in length and 6.3 mm in width, SUS304 was held at 1050° C. for 1 minutes under vacuum, followed by gas quenching to remove the effects of warpage caused by cutting and obtain the elastic material for the magnetostrictive element.

As the brazing material, a foil of an active Ag braze (AgCuTi, 50 μm thick) or a 25-μm thick amorphous foil of BNi-2 braze, that is an Ni brazing material, was used. The foil was cut into 40 mm in length and 5.9 mm in width, and one foil was sandwiched between the grain-oriented electrical steel sheet and the SUS304. A brazing treatment was performed under the following conditions, and the magnetostrictive element satisfying Condition B was obtained. The conditions for the brazing are as follows.

BNi-2 brazing foil: at 1050° C. for 10 minutes under vacuum
Active Ag brazing foil: at 1000° C. for 10 minutes under vacuum As a comparative example, a magnetostrictive element in which the above-mentioned grain-oriented electrical steel sheet 27ZH100 and the SUS304 are bonded with an epoxy adhesive at room temperature was produced.

ΔB of the produced magnetostrictive element was measured in the same manner as in Example 2 by using measurement unit 100 illustrated in FIG. 3 that applies a bending strain to the magnetostrictive element. It should be noted that in the present example, in consideration of one cycle of the vibration, ΔB obtained by pushing by 1 mm by applying a downward pressure 170 to the right end portion of magnetostrictive element 110 and ΔB obtained by pulling up by 1 mm were measured, and the sum of both measurements was set as the value of ΔB. The pushing was performed using a cylinder head of a micrometer. Further, since the cylinder head of the micrometer cannot pull up the end portion of the magnetostrictive element, the magnetostrictive element was disposed upside down and downward pressure 170 was applied to the right end portion of magnetostrictive element 110 to push it by 1 mm, so as to achieve the same state as when the end portion of magnetostrictive element 110 is pulled up. In addition, evaluation was made with the magnetic field applied to magnetostrictive element 110 set to 2800 A/m (35 Oe). The results are shown in Table 2.

TABLE 2

|  | Configuration of Magnetostrictive Element | ΔB (T) (Δh = 1.0 mm) |
|---|---|---|
| Inventive Example 2 | Electromagnetic Steel Sheet/Bni-2 Brazing Material Part/SUS304 | 0.35 |
| Inventive Example 3 | Electromagnetic Steel Sheet/Active Ag Brazing Material Part/SUS304 | 0.33 |
| Comparative Example 2 | Electromagnetic Steel Sheet/Adhesive Part/SUS304 | 0.22 |

As is clear from the result of Table 2, with respect to the magnetostrictive element of Inventive Example 2 and Inventive Example 3 that satisfy Condition B by bonding the electromagnetic steel sheet and the SUS304 (an elastic material) by brazing, ΔB was improved by approximately 1.6 times in Inventive Example 2 and 1.5 times in Inventive Example 3 as compared with the magnetostrictive element of Comparative Example 2 which uses an adhesive for bonding. A possible reason for this is that by replacing the lamination using an adhesive (such as resin) with the lamination using a metal brazing material having a large Young's modulus, the reduction of the strain between the layers under the bending strain was suppressed, and ΔB was improved.

In addition, while the bonding strength of the magnetostrictive element in which two electromagnetic steel sheets are bonded with an active Ag brazing material was 50N or less in Example 1, but a bond stronger than that of two electromagnetic steel sheets was obtained in Inventive Example 3 in which the electromagnetic steel sheet and the SUS304 are bonded with an active Ag brazing material. Therefore, peeling off of the bonding part does not occur easily by 1 mm downward pushing through bending in a cantilever beam manner alone, and ΔB became improved as compared to the bonding with an adhesive.

Example 6

ΔB of Magnetostrictive Element Composed of Grain-Oriented Electrical Steel Sheet/Brazing Material Part/SUS430

As the magnetostrictive material, grain-oriented electrical steel sheet 27ZH100 with coating, available from NIPPON STEEL CORPORATION, was used. The thickness of the electromagnetic steel sheet was 0.27 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.1 mm in width. A grain-oriented electrical steel sheet for the magnetostrictive element was obtained by annealing at 800° C. for two hours to remove the warpage caused during the cutting.

As the elastic material, SUS430, which is a ferritic stainless steel with magnetic properties, with a thickness of 0.5 mm, was used. After the cutting into a size of 40 mm in length and 6.5 mm in width, it was held at 1050° C. for 1 minutes under vacuum, followed by gas quenching to remove the effects of warpage caused by cutting and obtain the elastic material for the magnetostrictive element.

As the brazing material, a 25-μm thick amorphous foil of BNi-2 braze was used. The foil was cut into 40 mm in length and 6.1 mm in width, and one foil was sandwiched between the grain-oriented electrical steel sheet and SUS430. A brazing treatment was performed at 1050° C. for 10 minutes under vacuum, and the magnetostrictive element satisfying Condition B was obtained.

As a comparative example, the above-mentioned grain-oriented electrical steel sheet 27ZH100 and SUS430 were bonded with an epoxy adhesive at room temperature to obtain a magnetostrictive element.

$\Delta B$ was measured in the same manner as in Example 5 except that the applied bias magnetic field was changed to 3600 A/m (45 Oe). The results are shown in Table 3.

TABLE 3

|  | Configuration of Magnetostrictive Element | $\Delta B$ (T) ($\Delta h$ = 1.0 mm) |
|---|---|---|
| Inventive Example 4 | Electromagnetic Steel Sheet/Brazing Material Part/SUS430 | 0.31 |
| Comparative Example 3 | Electromagnetic Steel Sheet/ Adhesive Part/SUS430 | 0.21 |

As is clear from the result of Table 3, with respect to the magnetostrictive element of Inventive Example 4 satisfying Condition B by bonding SUS430 (which is a magnetic material) as the elastic material and the electromagnetic steel sheet by brazing, $\Delta B$ was improved by approximately 1.5 times than the magnetostrictive element of Comparative Example 3 which uses bonding with an adhesive. A possible reason for this is that by replacing the lamination using an adhesive (such as resin) with the lamination using the metal brazing material with large Young's modulus, the reduction of the strain between the layers under the bending strain was suppressed, and $\Delta B$ was improved.

Example 7

$\Delta B$ of Magnetostrictive Element Composed of Non-Oriented Electrical Steel Sheet/Brazing Material Part/SUS304

As the magnetostrictive material, non-oriented electrical steel sheet 35H210 with coating, available from NIPPON STEEL CORPORATION, was used. The thickness of the electromagnetic steel sheet was 0.35 mm. The rolling direction of the non-oriented electrical steel sheet was set to the longitudinal direction, and it was cut into 40 mm in length and 6.1 mm in width by shearing, followed by annealing at 740° C. for two hours to remove the warpage caused during the cutting and obtain the non-oriented electrical steel sheet for the magnetostrictive element.

As the elastic material, a cold-rolled plate of SUS304, which is a non-magnetic material, with a thickness of 0.5 mm was used. After the cutting into a size of 40 mm in length and 6.5 mm in width, it was held at 1050° C. for 1 minutes under vacuum, followed by gas quenching to remove the effects of warpage caused by cutting and obtain the elastic material for the magnetostrictive element.

As the brazing material, a 25-μm thick amorphous foil of BNi-2 braze was used. The foil was cut into 40 mm in length and 6.1 mm in width, and one foil was sandwiched between the non-oriented electrical steel sheet and the SUS304. A brazing treatment was performed at 1050° C. for 10 minutes under vacuum, and the magnetostrictive element satisfying Condition B was obtained.

As a comparative example, a magnetostrictive element was obtained by bonding the above-mentioned grain-oriented electrical steel sheet 35H210 and the SUS304 with an epoxy adhesive at room temperature.

$\Delta B$ was measured in the same manner as in Example 5 except that the applied bias magnetic field was changed to 3200 A/m (40 Oe). The results are shown in Table 4.

TABLE 4

|  | Configuration of Magnetostrictive Element | $\Delta B$ (T) ($\Delta h$ = 1.0 mm) |
|---|---|---|
| Inventive Example 5 | Electromagnetic Steel Sheet/Brazing Material Part/SUS304 | 0.21 |
| Comparative Example 4 | Electromagnetic Steel Sheet/ Adhesive Part/SUS304 | 0.15 |

As is clear from the result of Table 4, the magnetostrictive element of Inventive Example 5 satisfying Condition B by bonding the non-oriented electrical steel sheet and the SUS304 as the elastic material by brazing, $\Delta B$ was improved by 1.4 times than the magnetostrictive element of Comparative Example 4 which uses bonding with an adhesive. A possible reason for this is that by replacing the lamination using an adhesive such as resin with the lamination using the metal brazing material with large Young's modulus, the reduction of the strain between the layers under the bending strain was suppressed, and $\Delta B$ was improved.

Example 8

$\Delta B$ of Magnetostrictive Element Composed of Grain-Oriented Electrical Steel Sheet/Brazing Material Part/Grain-Oriented Electrical Steel Sheet/Adhesive Part/CFRP As the magnetostrictive material, the grain-oriented electrical steel sheet 35ZH115 with coating, available from NIPPON STEEL CORPORATION, was used. The thickness of the electromagnetic steel sheet was 0.35 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. Four grain-oriented electrical steel sheets for the magnetostrictive element were produced by annealing at 800° C. for two hours to remove the warpage caused during the cutting.

As the brazing material, a 25-μm thick amorphous foil of BNi-2 braze was used. The foil was cut into 40 mm in length and 6.0 mm in width, and sandwiched between the two grain-oriented electrical steel sheets. An electromagnetic steel sheet layer was obtained by performing a brazing treatment at 1050° C. for 10 minutes under vacuum to braze the two grain-oriented electrical steel sheets.

As the elastic material, a carbon fiber reinforced plastic (CFRP), which is a non-magnetic material, with a thickness of 0.5 mm was used. The direction of the carbon fiber was aligned with the longitudinal direction, and it was cut into 40 mm in length and 6.4 mm in width to obtain the elastic material for the magnetostrictive element.

The electromagnetic steel sheet layer with the brazed two grain-oriented electrical steel sheets and the elastic material (CFRP) were bonded at room temperature by using an epoxy adhesive to obtain a magnetostrictive element that satisfies Condition A.

As a comparative example, after bonding the above-mentioned two grain-oriented electrical steel sheets 35ZH115 with an epoxy adhesive at room temperature, the CFRP was bonded thereto by using an epoxy adhesive at room temperature to obtain a magnetostrictive element.

ΔB was measured in the same manner as in Example 5, except that the pushing depth of a cylinder head of a micrometer was changed to 0.5 mm and the applied bias magnetic field was changed to 8000 A/m (100 Oe). The results are shown in Table 5.

TABLE 5

| | Configuration of Magnetostrictive Element | ΔB (T) (Δh = 0.5 mm) |
|---|---|---|
| Inventive Example 6 | Electromagnetic Steel Sheet/Brazing Material Part/Electromagnetic Steel Sheet/Adhesive Part/CFRP | 0.17 |
| Comparative Example 5 | Electromagnetic Steel Sheet/Adhesive Part/Electromagnetic Steel Sheet/Adhesive Part/CFRP | 0.14 |

As is clear from the result of Table 5, with respect to the magnetostrictive element of Inventive Example 6 satisfying Condition A but not satisfying Condition B, ΔB was improved by approximately 1.2 times than the magnetostrictive element of Comparative Example 5 that does not include the brazing material part. A possible reason for this is that by replacing the lamination using an adhesive such as resin with the lamination using the metal brazing material with large Young's modulus, the reduction of the strain between the layers under the bending strain was suppressed, and ΔB was improved.

Example 9

ΔB of Magnetostrictive Element Composed of Grain-Oriented Electrical Steel Sheet/Brazing Material Part/Grain-Oriented Electrical Steel Sheet/Brazing Material Part/SUS304

As the magnetostrictive material, the grain-oriented electrical steel sheet 35ZH115 with coating, available from NIPPON STEEL CORPORATION, was used. The thickness of the electromagnetic steel sheet was 0.35 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. A grain-oriented electrical steel sheet for the magnetostrictive element was obtained by annealing at 800° C. for two hours to remove the warpage caused during the cutting.

As the elastic material, a cold-rolled plate of SUS304, which is a non-magnetic material, with a thickness of 0.83 mm was used. After the cutting into 40 mm in length and 6.0 mm in width, it was held at 1050° C. for 1 minutes under vacuum, followed by gas quenching to remove the effects of warpage caused by cutting and obtain the elastic material for the magnetostrictive element.

As the brazing material, a 25-μm thick amorphous foil of BNi-2 braze was cut into 40 mm in length and 6.0 mm in width. Two electromagnetic steel sheets and one SUS304 were stacked in the order of electromagnetic steel sheet/brazing material/electromagnetic steel sheet/brazing material/SUS304. The two grain-oriented electrical steel sheets and the SUS304 were brazed by performing a brazing treatment at 1050° C. for 10 minutes under vacuum, and a magnetostrictive element satisfying Condition A and Condition B was obtained.

The ΔB of the obtained magnetostrictive element was measured as in Example 8. The result is shown in Table 6.

TABLE 6

| | Configuration of Magnetostrictive Element | ΔB (T) (Δh = 0.5 mm) |
|---|---|---|
| Inventive Example 7 | Electromagnetic Steel Sheet/Brazing Material Part/Electromagnetic Steel Sheet/Brazing Material Part/SUS304 | 0.20 |

As is clear from Table 6, with respect to the magnetostrictive element of Inventive Example 7 satisfying Condition A and Condition B by forming all bonding parts by brazing, ΔB was improved by approximately 1.4 times than the magnetostrictive element of the above-mentioned Comparative Example 5 in which all bonding parts are formed by adhesion. In addition, with respect to the magnetostrictive element of Inventive Example 7, ΔB was improved by approximately 1.2 times than the magnetostrictive element of Inventive Example 6 that satisfies only Condition A with the elastic material layer bonded. A possible reason for this is that by replacing the lamination using an adhesive such as resin with the lamination using the metal brazing material with large Young's modulus, the reduction of the strain between the layers under the bending strain was suppressed, and ΔB was improved.

Example 10

ΔB of Magnetostrictive Element Composed of Grain-Oriented Electrical Steel Sheet/Brazing Material Part/SUS304

As the magnetostrictive material, grain-oriented electrical steel sheet 27ZH100 with coating, available from NIPPON STEEL CORPORATION, was used. The thickness of the electromagnetic steel sheet was 0.27 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. A grain-oriented electrical steel sheet for the magnetostrictive element was obtained by annealing at 800° C. for two hours to remove the warpage caused during the cutting.

As the elastic material, a cold-rolled plate of SUS304, which is a non-magnetic material, with a thickness of 0.5 mm was used. After the cutting into a size of 40 mm in length and 6.3 mm in width, it was held at 1050° C. for 1 minutes under vacuum, followed by gas quenching to remove the effects of warpage caused by cutting and obtain the elastic material for the magnetostrictive element.

As the brazing material, a 35-μm thick amorphous foil of BNi-1 braze or BNi-3 braze was used. The composition of the brazing material was as follows.

Composition of BNi-1: Ni-14% Cr-4.0% Si-3.5% B-4.5% Fe (mass %); Melting point: 1040° C.

Composition of BNi-3: Ni-4.5% Si-3.2% B, (mass %); Melting point: 1040° C.

Each foil was cut into 40 mm in length and 6.0 mm in width, and sandwiched between the grain-oriented electrical steel sheet and the SUS304. By performing a brazing treatment at 1100° C. for 10 minutes under vacuum, a magnetostrictive element satisfying Condition B was obtained.

The ΔB of the obtained magnetostrictive element was measured as in Example 5. The results are shown in Table 7.

TABLE 7

| | Configuration of Magnetostrictive Element | ΔB (T) (Δh = 1.0 mm) |
|---|---|---|
| Inventive Example 8 | Electromagnetic Steel Sheet/Brazing Material Part (BNi-1)/SUS304 | 0.34 |
| Inventive Example 9 | Electromagnetic Steel Sheet/Brazing Material Part (Bni-3)/SUS304 | 0.35 |

As is clear from Table 7, the magnetostrictive elements of Inventive Examples 8 and 9 each satisfying Condition B by bonding the electromagnetic steel sheet and the SUS304 (which is an elastic material) by brazing, ΔB was improved by approximately 1.5 to 1.6 times than the magnetostrictive element of Comparative Example 2 in which the same electromagnetic steel sheet and elastic material are bonded with an adhesive. A possible reason for this is that by replacing the lamination using an adhesive such as resin with the lamination using the metal brazing material with large Young's modulus, the reduction of the strain between the layers under the bending strain was suppressed, and ΔB was improved.

Example 11

Magnetostrictive Power Generation Device Containing Magnetostrictive Element Composed of Grain-Oriented Electrical Steel Sheet/Brazing Material Part (Ni)/SUS304

In Example 11, magnetostrictive power generation device 200 having the structure illustrated in FIG. 6 was produced using a grain-oriented electrical steel sheet as electromagnetic steel sheet layer 221 and using a SUS304 as elastic material layer 222.

As electromagnetic steel sheet layer 221, grain-oriented electrical steel sheet 27ZH100 with coating, available from NIPPON STEEL CORPORATION, was used. The thickness was mm, and the crystallographic orientation was {110}<001> GOSS texture. The longitudinal direction of the grain-oriented electrical steel sheet was taken as the <001> direction, and the grain-oriented electrical steel sheet was cut by shearing into 100 mm in length and 6.0 mm in width. The sheet was bent and shaped in a U-shape as illustrated in FIG. 6. The length corresponding to fixing part 270 on the lower side was set to approximately 40 mm, and the length of the portion where detection coil 260 and anchor 240 are placed on the upper side was set to approximately 40 mm.

Note that after bending the grain-oriented electrical steel sheet in a U-shape, the sheet was subjected to annealing at 800° C. for two hours to remove the warpage.

As elastic material layer 222, the SUS304, which is a non-magnetic material, with a thickness of 0.5 mm and a width of 6.0 mm was used. It was cut into 140 mm in length, and molded and shaped in a U-shape for integration with the U-shaped electromagnetic steel sheet. Note that the SUS304 molded in a U-shape was held in a vacuum at 1050° C. for 1 minutes, followed by solution heat treatment through gas quenching to remove the effects of warpage caused by cutting.

As the brazing material, a 35-μm thick amorphous foil of BNi-2 braze was used. The foil was cut into 100 mm in length and 6.0 mm in width, and one foil was aligned with the position of the grain-oriented electrical steel sheet and fixed to prevent shifting between the grain-oriented electrical steel sheet and the SUS304 bent in a U-shape. A laminate was obtained by performing a brazing treatment at 1050° C. for 10 minutes under vacuum, and an integral structure in which a part of the frame (100 mm/140 mm=approximately 71%) is composed of the above-mentioned laminate 220, and the entirety of frame 230 and elastic material layer 222 extended from stress control part 212 of magnetostrictive element 210 are integrated was obtained.

For comparison, an integral structure was produced by bending each of the SUS304 and the grain-oriented electrical steel sheet in a U-shape with the same size as that described above, and bonding the sheets at room temperature with an epoxy adhesive.

Detection coil 260 with 5000 turns is loaded at the portion corresponding to the magnetostrictive element of the obtained integral structure. The length of the coil was 15 mm. Next, 7 g of tungsten anchor 240 was fixed and bonded next to magnetostrictive element 210. Further, NdFeB magnet 250 was bonded on the electromagnetic steel sheet side of the fixing part on the lower side of the U-shape, and magnetostrictive power generation device 200 in which the entirety of the frame is integrated with the magnetostrictive element was obtained.

The AC voltage induced to the detection coil of produced magnetostrictive power generation device 200 was taken using a digital oscilloscope, and the voltage was measured. The performance of the magnetostrictive power generation device was evaluated based on the peak voltage of the measured voltage waveform. More specifically, fixing part 270 on the lower side of the U-shape of the magnetostrictive power generation device was fixed on an excitation apparatus with an adhesive. Next, a bias magnetic field was applied with an NdFeB magnet. Note that peak voltage was measured by changing the strength (size) of the magnet, and the magnet which showed a maximum peak voltage was used.

Note that the strength of the magnetic field applied to the magnetostrictive element was estimated to be approximately 2800 A/m (35 Oe) for the grain-oriented electrical steel sheet.

The excitation apparatus was excited at 0.5G, and the peak voltage at the resonance frequency was measured with an oscilloscope by changing the frequency.

The measured resonance frequency was 105 Hz for the braze bonded member and 97 Hz for the adhesive bonded member. The peak voltages are shown in Table 8.

TABLE 8

| | Configuration of Magnetostrictive Element | Peak Voltage (mV) |
|---|---|---|
| Inventive Example 10 | Electromagnetic Steel Sheet/ Brazing Material Part (Ni)/SUS304 | 1360 |
| Comparative Example 6 | Electromagnetic Steel Sheet/ Adhesive Part/SUS304 | 972 |

As is clear from Table 8, with respect to the device of Inventive Example 10 containing the magnetostrictive element satisfying Condition B (i.e., the electromagnetic steel sheet and the SUS304, which is an elastic material, are bonded by brazing), the peak voltage was improved by approximately 1.4 times than the device of Comparative Example 6 containing the magnetostrictive element in which the electromagnetic steel sheet and the elastic material are bonded with an adhesive. A possible reason for this is that by replacing the lamination using an adhesive (such as a resin) with the lamination using the metal brazing material with large Young's modulus, the reduction of the strain between laminates that occurs under the bending strain is suppressed and the peak voltage is improved.

Example 12

Magnetostrictive Power Generation Device Containing Magnetostrictive Element Composed of Grain-Oriented Electrical Steel Sheet/Brazing Material Part/SUS430

In Example 12, magnetostrictive power generation device 300 having the structure illustrated in FIG. 7 was produced using a grain-oriented electrical steel sheet as electromagnetic steel sheet layer 321, and using SUS430, which is a magnetic material, as elastic material layer 322.

As electromagnetic steel sheet layer 321, grain-oriented electrical steel sheet 27ZH100 available from NIPPON STEEL CORPORATION with coating was used. The thickness was 0.27 mm, and the crystallographic orientation was {110}<001> GOSS texture. The longitudinal direction of the grain-oriented electrical steel sheet was taken as the <001> direction, and the grain-oriented electrical steel sheet was cut by shearing into 100 mm in length and 6.0 mm in width. The obtained sheet was bent and shaped in a U-shape as illustrated in FIG. 7. The length of fixing part 370 on the lower side was set to approximately 40 mm, and the length of the portion where detection coil 360 and anchor 340 are placed on the upper side was set to approximately 40 mm. Note that after the grain-oriented electrical steel sheet was bent in a U-shape, the sheet was subjected to annealing at 800° C. for two hours to remove the warpage.

As elastic material layer 322, SUS430, which is a magnetic material, with a thickness of 0.5 mm and a width of 6.0 mm was used. It was cut into 140 mm in length, and molded and shaped in a U-shape for integration with the U-shaped electromagnetic steel sheet. Note that SUS430 molded in a U-shape was held in a vacuum at 1050° C. for 1 minutes, followed by solution heat treatment through gas quenching to remove the effects of warpage caused by cutting.

As the brazing material, a 35-μm thick amorphous foil of BNi-2 braze was used. The foil was cut into 100 mm in length and 6.0 mm in width, aligned with the position of the directional silicon steel sheet and fixed to prevent shifting between the SUS430 and the grain-oriented electrical steel sheet bent in a U-shape. A laminate was obtained by performing a brazing treatment at 1050° C. for 10 minutes under vacuum, and an integral structure in which a part of the frame (100 mm/140 mm=approximately 71%) is composed of the above-mentioned laminate 320, and the entirety of frame 330 and elastic material layer 322 extended from stress control part 312 of magnetostrictive element 310 are integrated was obtained.

For comparison, an integral structure in which the SUS430 and the grain-oriented electrical steel sheet bent in a U-shape with the same size as that described above are bonded at room temperature by using an epoxy adhesive was produced.

Detection coil 360 of 5000 turns was loaded at the portion corresponding to the magnetostrictive element of the obtained integral structure. The length of the coil was 15 mm. Next, 7 g of tungsten anchor 340 was fixed by bonding next to magnetostrictive element 310. Further, NdFeB magnet 350 was bonded on the electromagnetic steel sheet side of the fixing part on the lower side of the U-shape, and magnetostrictive power generation device 300 in which the entirety of the frame is integrated with the magnetostrictive element was obtained.

The voltage of magnetostrictive power generation device 300 was measured in the same manner as in Example 11, and the performance of the magnetostrictive power generation device was evaluated based on the peak voltage of the measured voltage waveform.

Note that the strength of the magnetic field applied to the magnetostrictive element was estimated to be approximately 3600 A/m (45 Oe) for the grain-oriented electrical steel sheet.

The measured resonance frequency was 109 Hz for the braze bonded member, and 101 Hz for the adhesive bonded member. The peak voltages are shown in Table 9.

TABLE 9

|  | Configuration of Magnetostrictive Element | Peak Voltage (mV) |
| --- | --- | --- |
| Inventive Example 11 | Electromagnetic Steel Sheet/Brazing Material Part/SUS430 | 1245 |
| Comparative Example 7 | Electromagnetic Steel Sheet/Adhesive Part/SUS430 | 958 |

As is clear from Table 9, with respect to the device of Inventive Example 11 containing the magnetostrictive element satisfying Condition B (i.e., electromagnetic steel sheet and SUS430, which is an elastic material, bonded by brazing), the peak voltage was improved by approximately 1.3 times than the device of Comparative Example 7 in which the electromagnetic steel sheet and the elastic material are bonded with an adhesive. A possible reason for this is that by replacing the lamination using an adhesive such as resin with the lamination using the metal brazing material with large Young's modulus, the reduction of the strain between laminates that occurs under the bending strain was suppressed, and the peak voltage was improved.

Example 13

Magnetostrictive Power Generation Device Containing Magnetostrictive Element Composed of Electromagnetic Steel Sheet/Brazing Material Part/SUS304/Brazing Material Part/Electromagnetic Steel Sheet In Example 13, magnetostrictive power generation device 400 having the structure illustrated in FIG. 8 was produced by using a grain-oriented electrical steel sheet as electromagnetic steel sheet layer 421, and using SUS304 as elastic material layer 422.

As electromagnetic steel sheet layer 421, grain-oriented electrical steel sheet 27ZH100 with coating, available from NIPPON STEEL CORPORATION, was used. The thickness was mm, and the crystallographic orientation was {110}<001> GOSS texture. The longitudinal direction of the grain-oriented electrical steel sheet was taken as the <001> direction, and the sheet was cut by shearing into 120 mm in length and 6.0 mm in width, and into 125 mm in length and 6.0 mm in width. The obtained sheet was bent and shaped in a U-shape as illustrated in FIG. 8. The length of fixing part 470 on the lower side was set to approximately 80 mm, and the length of the portion where detection coil 460 and anchor 440 are placed on the upper side was set to approximately 50 mm.

Note that after the grain-oriented electrical steel sheet was bent in a U-shape, the sheet was subjected to annealing at 800° C. for two hours to remove the warpage.

As elastic material layer 422, SUS304, which is a non-magnetic material, was used. The thickness was set to 0.5 mm, the length was set to approximately 140 mm, the width of the portion comprising fixing part 470 was set to 6.0 mm, the width of the portion comprising fixing part 470 was set to 12 mm, and a hole through which grain-oriented electrical steel sheet layer 421 is passed is provided in a part of fixing part 470.

As illustrated in FIG. 8, the grain-oriented electrical steel sheets were disposed on both sides of SUS304. At the fixing part the outer magnetostrictive material is in contact with the inner electromagnetic steel sheet through the hole provided in the SUS304. The outer and inner electromagnetic steel sheets are in contact with each other also at the end on the side on which anchor 440 is disposed. As described above, by bringing the inner and outer electromagnetic steel sheets into contact with each other, the electromagnetic steel sheet can be efficiently magnetized with the magnet. Further, at the fixing part SUS304 with the same thickness as that of the electromagnetic steel sheet was bonded as height adjustment plate 490. Note that the SUS304 molded in a U-shape was held in a vacuum at 1050° C. for 1 minutes, followed by solution heat treatment through gas quenching to remove the effects of warpage caused by cutting.

As the brazing material, a 35-μm thick amorphous foil of BNi-2 braze was used, and the foil was cut into 100 mm in length and 6.0 mm in width. The brazing material is sandwiched and fixed to prevent shifting of the position at the position where each of the inner and outer grain-oriented electrical steel sheets bent in a U-shape and the elastic material (SUS304) make contact with each other. Laminate 420 was obtained by performing a brazing treatment at 1050° C. for 10 minutes under vacuum, and an integral structure in which a part of the frame (100 mm/140 mm=approximately 71%) is composed of the above-mentioned laminate 420, and the entirety of frame 430 and elastic material layer 422 extended from stress control part 412 of magnetostrictive element 410 are integrated was obtained. Further, a block of SUS304 was bonded as pillar 480 to the grain-oriented electrical steel sheet by using an epoxy adhesive.

For comparison, an integral structure in which the SUS304 and the grain-oriented electrical steel sheet bent in a U-shape with the same size as that described above are bonded at room temperature with an epoxy adhesive was produced.

Detection coil 460 of 5000 turns was loaded at the portion corresponding to the magnetostrictive element of the obtained integral structure. The length of the coil was 15 mm. Next, 7 g of tungsten anchor 440 was fixed by bonding next to magnetostrictive element 410. Further, NdFeB magnet 450 was bonded on the electromagnetic steel sheet side of the fixing part on the lower side of the U-shape, and magnetostrictive power generation device 400 in which the entirety of the frame is integrated with the magnetostrictive element was obtained.

The voltage of magnetostrictive power generation device 400 was measured in the same manner as in Example 11, and the performance of the magnetostrictive power generation device was evaluated based on the peak voltage of the measured voltage waveform.

Note that the strength of the magnetic field applied to the magnetostrictive element was estimated to be approximately 2800 A/m (35 Oe) at each of the inner and outer grain-oriented electrical steel sheets.

The measured resonance frequency was 221 Hz for the brazed bonded member, and 205 Hz for the adhesive bonded member. The peak voltages are shown in Table 10.

TABLE 10

|  | Configuration of Magnetostrictive Element | Peak Voltage (mV) |
| --- | --- | --- |
| Inventive Example 12 | Electromagnetic Steel Sheet/Brazing Material Part/SUS304/Brazing Material Part/Electromagnetic Steel Sheet | 1283 |
| Comparative Example 8 | Electromagnetic Steel Sheet/Adhesive Part/SUS304/Adhesive Part/Electromagnetic Steel Sheet | 987 |

As is clear from Table 10, with respect to the device of Inventive Example 12 containing the two electromagnetic steel sheet layers and the magnetostrictive element satisfying Condition B (i.e., the electromagnetic steel sheet and the SUS304, which is an elastic material, bonded by brazing), the peak voltage was improved by approximately 1.3 times than the device of Comparative Example 8 containing the magnetostrictive element in which the electromagnetic steel sheet and the elastic material are bonded with an adhesive. A possible reason for this is that by replacing the lamination using an adhesive (such as a resin) with the lamination using the metal brazing material with large Young's modulus, the reduction of the strain between laminates that occurs under the bending strain was suppressed, and the peak voltage was improved.

Example 14

Cross-Sectional Structure of Brazing Material Part: Magnetostrictive Element Composed of Electromagnetic Steel Sheet/Brazing Material Part/Electromagnetic Steel Sheet As the magnetostrictive material, the grain-oriented electrical steel sheet 35ZH115 with coating, available from NIPPON STEEL CORPORATION, was used. The thickness of the electromagnetic steel sheet was 0.35 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. A grain-oriented electrical steel sheet for the magnetostrictive element was obtained by annealing at 800° C. for two hours to remove the warpage caused during the cutting.

One amorphous foil of BNi-2 braze, which is an Ni brazing material, with a length of 40 mm, a width of 6.0 mm, and a thickness of 59 μm as the brazing material was sandwiched between the obtained two grain-oriented electrical steel sheets, followed by a brazing treatment under vacuum at 1050° C. for 60 minutes to obtain a magnetostrictive element satisfying Condition A (i.e., with a brazing material part between two electromagnetic steel sheets). Note that the composition of the brazing material was as follows. BNi-2 braze: Ni-7.0% Cr-4.5% Si-3.0% B-3.0% Fe The obtained magnetostrictive element was cut in the widthwise direction, and an elemental analysis was performed for the cross-sectional structure along the stacking thickness direction with a SEM-EDS (JEOLJSM-7000F). The cross-sectional structure and the result of the elemental analysis are shown in FIG. 9.

The elemental analysis was performed on the analytic line illustrated in FIG. 9. The Fe concentration profile is high inside the electromagnetic steel sheet, but is very low at the center portion of the brazing material part. On the other hand, the concentration profile of Ni is high inside the brazing material part, and is very low in the center portion of the electromagnetic steel sheet. However, at or near the contact surface of the electromagnetic steel sheet and the brazing material part indicated by a circle illustrated in the drawing, there is a region where Fe derived from the electromagnetic steel sheet and Ni derived from the Ni-based brazing material part are alloyed. The concentrations of Fe and Ni were determined by performing a point analysis with an EDS at a plurality of positions on the analytic line of FIG. 9, and determining the composition of that portion. At a position of the brazing material part side which is 1 μm from the contact surface of the Ni-based brazing material and the electromagnetic steel sheet on the left side in FIG. 9, the Fe concentration was approximately 64 mass %, which is a value equal to or more than [the Fe concentration of the brazing material used: 3 mass %]+0.2 mass %. Further, at a position of the electromagnetic steel sheet side which is 1 μm on from the contact surface of the electromagnetic steel sheet and the Ni-based brazing material, the Ni concentration was approximately 1.1 mass %, which is a value equal to or more than [the Ni concentration of the electromagnetic steel sheet used: 0 mass %]+0.2 mass %. Accordingly, on each of the electromagnetic steel sheet side and the brazing material part side, there was a region with a width of 1 μm or more, i.e., a total of 2 μm or more, where Fe and Ni are alloyed at the contact surface of the electromagnetic steel sheet and the Ni-based brazing material part.

Example 15

ΔB of Magnetostrictive Element Composed of Grain-Oriented Electrical Steel Sheet/Brazing Material Part (Fe)/SUS304

As the magnetostrictive material, grain-oriented electrical steel sheet 27ZH100 with coating, available from NIPPON STEEL CORPORATION, was used. The thickness of the electromagnetic steel sheet was 0.27 mm, and the crystallographic orientation was {110} <001> GOSS texture. The longitudinal direction of the grain-oriented electrical steel sheet was taken as the <001> direction, and the grain-oriented electrical steel sheet was cut by shearing into 40 mm in length and 6.0 mm in width. A grain-oriented electrical steel sheet for the magnetostrictive element was obtained by annealing at 800° C. for two hours to remove the warpage caused during the cutting.

A cold-rolled plate of SUS304, which is a non-magnetic material, with a thickness of mm was used as the elastic material. After the cutting into a size of 40 mm in length and 6.3 mm in width, it was held at 1050° C. for 1 minutes under vacuum, followed by gas quenching to remove the effects of warpage caused by cutting and obtain the elastic material for the magnetostrictive element.

As the brazing material, a powdered Fe brazing material with the following composition was used. The powder size was 150 μm or less, and the composition of the brazing material was as follows.

Composition of Fe-based brazing material: Fe-20% Cr-20% Ni-5.0% Si-8.0% P-2.0% Mo The powdered brazing material was mixed with an organic binder and applied to one surface of SUS304, and then the electromagnetic steel sheet was overlaid on the applied surface, followed by a brazing treatment at 1100° C. for 30 minutes under vacuum to obtain the magnetostrictive element satisfying Condition B. The thickness of the brazing material was 23 μm. The organic binder was volatilized and removed during the brazing temperature increase.

ΔB of the produced magnetostrictive element was measured in the same manner as in Example 5. The result is shown in Table 11 together with the measurement result of the magnetostrictive element of Comparative Example 2 using an adhesive instead of the brazing material produced in Example 5.

TABLE 11

| | Configuration of Magnetostrictive Element | ΔB (T) (Δh = 1.0 mm) |
|---|---|---|
| Inventive Example 13 | Electromagnetic Steel Sheet/Brazing Material Part (Fe)/SUS304 | 0.34 |
| Comparative example 2 | Electromagnetic Steel Sheet/Adhesive Part/SUS304 | 0.22 |

As is clear from the result of Table 11, with respect to the magnetostrictive element of Inventive Example 13 satisfying Condition B in which the electromagnetic steel sheet and the SUS304, which is an elastic material, are bonded by brazing, ΔB was improved by approximately 1.5 times than the magnetostrictive element of Comparative Example 2 using bonding with an adhesive. A possible reason for this is that by replacing the lamination using an adhesive such as resin with the lamination using the metal brazing material with large Young's modulus, the reduction of the strain between the layers under the bending strain was suppressed, and ΔB was improved.

Example 16

Magnetostrictive Power Generation Device Containing Magnetostrictive Element Composed of Electromagnetic Steel Sheet/Brazing Material Part (Fe)/SUS304

A magnetostrictive power generation device with the same structure as that of magnetostrictive power generation device 200 illustrated in FIG. 6 was produced as in Example 11. It should be noted that the Ni-based brazing material used in Example 11 was changed to the Fe-based brazing material which is the same as that used in Example 15. A grain-oriented electrical steel was used as electromagnetic steel sheet layer 221, and SUS304 was used as elastic material layer 222 as in Example 11 except for the change of the brazing material.

As electromagnetic steel sheet layer 221, grain-oriented electrical steel sheet 27ZH100 with coating, available from NIPPON STEEL CORPORATION, was used. The thickness was 0.27 mm, and the crystallographic orientation was {110}<001> GOSS texture. The longitudinal direction of the grain-oriented electrical steel sheet was taken as the <001> direction, and the grain-oriented electrical steel sheet was cut by shearing into 100 mm in length and 6.1 mm in width. The sheet was bent and shaped in a U-shape as illustrated in FIG. 6. The length corresponding to fixing part 270 on the lower side was set to approximately 40 mm, and the length of the portion where detection coil 260 and anchor 240 are placed on the upper side was set to approximately 40 mm. Note that after the grain-oriented electrical steel sheet was bent in a U-shape, the sheet was subjected to annealing at 800° C. for two hours to remove the warpage.

As elastic material layer 222, the SUS304, which is a non-magnetic material, with a thickness of 0.5 mm and a width of 6.1 mm was used. It was cut into 140 mm in length, and molded and shaped in a U-shape for integration with the U-shaped electromagnetic steel sheet. Note that the SUS304 molded in a U-shape was held in a vacuum at 1050° C. for 1 minutes, followed by solution heat treatment through gas quenching to remove the effects of warpage caused by cutting.

As the brazing material, a Fe-based brazing material mixed with the same organic binder as that of Example 15 was used. The brazing material was applied, and fixed to prevent shifting, between the SUS304 and the grain-oriented electrical steel sheet bent in a U-shape. A laminate was obtained by performing a brazing treatment at 1100° C. for 30 minutes under vacuum, and an integral structure of Inventive Example 14 in which a part of the frame (100 mm/140 mm=approximately 71%) is composed of the above-mentioned laminate 220, and the entirety of frame 230 and elastic material layer 222 extended from stress control part 212 of magnetostrictive element 210 are integrated was obtained. The thickness of the brazing material was 33 μm. The organic binder was volatilized and removed during the brazing temperature increase.

The peak voltage was measured as in Example 11 for the magnetostrictive element of the obtained integral structure. The results are shown in Table 12 together with the measurement result of the magnetostrictive element of Comparative Example 6 using an adhesive instead of the brazing material produced in Example 11. The measured resonance frequency was 107 Hz.

TABLE 12

| | Configuration of Magnetostrictive Element | Peak Voltage (mV) |
|---|---|---|
| Inventive Example 14 | Electromagnetic Steel Sheet/Brazing Material Part (Fe)/SUS304 | 1340 |
| Comparative Example 6 | Electromagnetic Steel Sheet/ Adhesive Part/SUS304 | 972 |

As is clear from Table 12, with respect to the device of Inventive Example 14 containing the magnetostrictive element satisfying Condition B (i.e., the electromagnetic steel sheet and the SUS304, which is an elastic material, bonded by brazing), the peak voltage was improved by approximately 1.4 times than the device of Comparative Example 6 comprising the magnetostrictive element in which the electromagnetic steel sheet and the elastic material are bonded with an adhesive. A possible reason for this is that by replacing the lamination using an adhesive such as resin with the lamination using the metal brazing material with large Young's modulus, the reduction of the strain between laminates that occurs under the bending strain is suppressed and the peak voltage is improved.

Example 17

Bonding Strength of Fe-Based Brazing Material

A laminate (test piece) for the tensile test for measuring the bonding strength was produced as in Example 1 except that the brazing material was changed to the Fe-based brazing material used in Example 15. As the brazing material, a powdered Fe brazing material with the following composition was used.

Composition of Fe-based brazing material: Fe-20% Cr-20% Ni-5.0% Si-8.0% P-2.0% Mo The powdered brazing material was mixed with the organic binder and applied to one surface of one electromagnetic steel sheet, and then another one electromagnetic steel sheet was overlaid on the applied surface, followed by a brazing treatment at 1100° C. for 30 minutes under vacuum to obtain a laminate satisfying Condition A. The thickness of the brazing material was 26 μm. The organic binder was volatilized and removed during the brazing temperature increase.

The tensile test was performed as in Example 1 for the obtained test piece, and as a result no breakage occurred at the bonding part, but breakage occurred in the base material.

Example 18

Durability of Magnetostrictive Element Composed of Electromagnetic Steel Sheet/Brazing Material Part (Fe)/Electromagnetic Steel Sheet A laminate for measuring durability was produced as in Example 2 except that the brazing material was changed to the Fe-based brazing material used in Example 15. As the brazing material, a powdered Fe brazing material with the following composition was used.

Composition of Fe-based brazing material: Fe-20% Cr-20% Ni-5.0% Si-8.0% P-2.0% Mo The powdered brazing material was mixed with the organic binder and applied to one surface of one electromagnetic steel sheet, and then another electromagnetic steel sheet was overlaid on the applied surface, followed by a brazing treatment at 1100° C. for 30 minutes under vacuum to obtain a laminate satisfying Condition A. The thickness of the brazing material was 25 μm. The organic binder was volatilized and removed during the brazing temperature increase.

The reduction rate of ΔB after the endurance test was measured as in Example 2. The result is shown in Table 13 together with the measurement result of the magnetostrictive element of Comparative Example 1 using an adhesive instead of the brazing material produced in Example 2.

TABLE 13

| | Configuration of Magnetostrictive Element | ΔB (T) Reduction Rate (%) |
|---|---|---|
| Inventive Example 15 | Electromagnetic Steel Sheet/Brazing Material Part (Fe)/Electromagnetic Steel Sheet | −4.5% |
| Comparative Example 1 | Electromagnetic Steel Sheet/Adhesive Part/Electromagnetic Steel Sheet | −12.5% |

As is clear from the result of Table 13, with respect to the magnetostrictive element of Inventive Example 15 satisfying Condition A in which two electromagnetic steel sheets were bonded by brazing with a Fe-based brazing material, the reduction of ΔB was reduced and the durability was improved in comparison with the magnetostrictive element of Comparative Example 1 bonded with an adhesive.

INDUSTRIAL APPLICABILITY

The present invention provides a power generating magnetostrictive element and a magnetostrictive power generation device capable of achieving a magnetostrictive power generation in an amount equivalent to or exceeding that of the prior art and having high durability at a cost lower than that of the magnetostrictive element using a FeGa alloy, FeCo alloy, or FeAl alloy as a magnetostrictive material. The power generating magnetostrictive element of the present invention is lower in cost as compared to the conventional magnetostrictive elements, but enables the achievement of power generation in an amount equivalent to or exceeding that of the magnetostrictive power generation devices. Therefore, it is useful as a power source in not only wireless sensor module for IoT or the like, but also in various devices.

Present application claims priority to Japanese Patent Application No. 2020-202619 filed on Dec. 7, 2020, and No. 2021-101012 filed on Jun. 17, 2021. The contents set forth in the specification of the basic applications are incorporated herein by reference in their entirety.

REFERENCE SIGNS LIST

1 Magnetostrictive element
2 Fixing part
100 Magnetic flux density change ΔB measuring unit
110 Magnetostrictive element
111 Magnetostrictive part
112 Stress control part
120 Bias magnetic field coil
130 Detection coil
140 Direct current power source
150 Fixation support base
160 Flux meter
170 Pressure
171 Movement length
200, 300, 400 Magnetostrictive power generation device
210, 310, 410 Power generating magnetostrictive element
211, 311, 411 Magnetostrictive part (Electromagnetic steel sheet layer)
212, 312, 412 Stress control part (Elastic material layer)
220, 320, 420 Laminate
221, 321, 421 Electromagnetic steel sheet layer
222, 322, 422 Elastic material layer
230, 330, 430 Frame
240, 340, 440 Anchor
250, 350, 450 Magnet
260, 360, 460 Detection coil
270, 370, 470 Fixing part
480 Pillar
490 Height adjustment plate

The invention claimed is:

1. A power generating magnetostrictive element formed of a laminate comprising at least one electromagnetic steel sheet layer,
wherein the at least one electromagnetic steel sheet layer comprises at least one electromagnetic steel sheet;
wherein the laminate satisfies at least one of the following Conditions A or B:
Condition A: the at least one electromagnetic steel sheet layer comprises two or more electromagnetic steel sheets, and the two or more electromagnetic steel sheets are bonded to each other through a brazing material part; or
Condition B: the laminate further comprises at least one elastic material layer, and the at least one electromagnetic steel sheet layer is bonded to the elastic material layer through a brazing material part; and
wherein the at least one electromagnetic steel sheet layer is the magnetostrictive part of the power generating magnetostrictive element and does not contain a material having $\lambda 100$ of 80 ppm or more, the $\lambda 100$ being an amount of magnetostriction in <100> direction of the material.

2. The power generating magnetostrictive element according to claim 1, wherein the laminate satisfies only the Condition A.

3. The power generating magnetostrictive element according to claim 2, wherein:
the laminate further comprises at least one elastic material layer, and
the at least one elastic material layer is bonded to the at least one electromagnetic steel sheet layer.

4. The power generating magnetostrictive element according to claim 1, wherein the laminate satisfies both the Condition A and the Condition B.

5. The power generating magnetostrictive element according to claim 1, wherein:
the at least one electromagnetic steel sheet layer consists of one electromagnetic steel sheet, and
the laminate satisfies only the Condition B.

6. The power generating magnetostrictive element according to claim 1, wherein the at least one electromagnetic steel sheet comprised in the at least one electromagnetic steel sheet layer is a grain-oriented electrical steel sheet.

7. The power generating magnetostrictive element according to claim 1, wherein the at least one electromagnetic steel sheet comprised in the at least one electromagnetic steel sheet layer is a non-oriented electrical steel sheet.

8. The power generating magnetostrictive element according to claim 1, 6 or 7, wherein the at least one elastic material layer is formed of a non-magnetic material.

9. The power generating magnetostrictive element according to claim 1, 6 or 7, wherein the brazing material part comprises Ni as a major element, together with at least one element selected from the group consisting of Cr, Si, Fe, B, P, C, Cu, and Mo, and further comprises at least one oxide selected from the group consisting of a Mg oxide, a Cr oxide, and a Si oxide.

10. The power generating magnetostrictive element according to claim 9, wherein:
an alloyed region where Fe derived from the at least one electromagnetic steel sheet and Ni derived from the brazing material part are alloyed is present in at least one contact surface between the at least one electromagnetic steel sheet and the brazing material part in the power generating magnetostrictive element, and
a width of the alloyed region is 2 μm or more as measured by an elemental analysis of a cross-section in a thicknesswise direction of the power generating magnetostrictive element.

11. The power generating magnetostrictive element according to claim 1, 6 or 7, wherein the brazing material part comprises Fe as a major element, together with at least one element selected from the group consisting of Cr, Ni, Si, B, P, C, Cu, and Mo, and further comprises at least one oxide selected from the group consisting of a Mg oxide, a Cr oxide, and a Si oxide.

12. The power generating magnetostrictive element according to claim 9, wherein the at least one oxide is present in a bulk form in the brazing material part.

13. The power generating magnetostrictive element according to claim 11, wherein the at least one oxide is present in a bulk form in the brazing material part.

14. A magnetostrictive power generation device, comprising:
the power generating magnetostrictive element according to any one of claims 1, 2, 4, 5, 6 and 7; and
a frame connected to the power generating magnetostrictive element.

15. The magnetostrictive power generation device according to claim 14, wherein:
the power generating magnetostrictive element and the frame are continuous, and
at least a part of the frame comprises the laminate which forms the power generating magnetostrictive element.

16. The magnetostrictive power generation device according to claim 15, wherein an entirety of the frame is integrated with the electromagnetic steel sheet extending from the laminate which forms the power generating magnetostrictive element.

17. The magnetostrictive power generation device according to claim 15, wherein:
the laminate comprises an elastic material, and
an entirety of the frame is integrated with the elastic material extending from the laminate which forms the power generating magnetostrictive element.

18. The magnetostrictive power generation device according to claim 15, wherein an entirety of the frame is integrated with the power generating magnetostrictive element.

\* \* \* \* \*